US011074022B2

(12) United States Patent
Ren et al.

(10) Patent No.: US 11,074,022 B2
(45) Date of Patent: Jul. 27, 2021

(54) PRINTER AND NON-TRANSITORY COMPUTER-READABLE RECORDING MEDIUM STORING COMPUTER-READABLE INSTRUCTIONS FOR PRINTER

(71) Applicant: BROTHER KOGYO KABUSHIKI KAISHA, Nagoya (JP)

(72) Inventors: Yongyong Ren, Nagoya (JP); Shunsuke Yamamoto, Okazaki (JP)

(73) Assignee: Brother Kogyo Kabushiki Kaisha, Aichi (JP)

( * ) Notice: Subject to any disclaimer, the term of this patent is extended or adjusted under 35 U.S.C. 154(b) by 0 days.

(21) Appl. No.: 16/824,981

(22) Filed: Mar. 20, 2020

(65) Prior Publication Data
US 2020/0301639 A1   Sep. 24, 2020

(30) Foreign Application Priority Data

Mar. 22, 2019   (JP) .............................. JP2019-055239
Mar. 22, 2019   (JP) .............................. JP2019-055369

(51) Int. Cl.
   *G06F 3/12* (2006.01)
(52) U.S. Cl.
   CPC .......... *G06F 3/1271* (2013.01); *G06F 3/1207* (2013.01); *G06F 3/1273* (2013.01)

(58) Field of Classification Search
   CPC .... G06F 3/1271; G06F 3/1288; G06F 3/1207; G06F 3/1273; G06F 3/1287
   See application file for complete search history.

(56) References Cited

U.S. PATENT DOCUMENTS

2015/0324153 A1* 11/2015 Ding ..................... G06F 3/1267
                                                          358/1.15
2018/0270387 A1*  9/2018 Furuta .................. G06F 3/1259

FOREIGN PATENT DOCUMENTS

| JP | 2016-177438 A | 10/2016 |
| JP | 2017-182123 A | 10/2017 |
| JP | 2018-058301 A | 4/2018 |

* cited by examiner

*Primary Examiner* — Moustapha Diaby
(74) *Attorney, Agent, or Firm* — Scully, Scott, Murphy & Presser, PC

(57) ABSTRACT

A printer may receive print data and data identification information from a server. The printer may store target data obtained by using the print data and the data identification information in a second table in association with each other in a case where the print data and the data identification information are received from the server. The printer may send a related information request to the server in a case where a predetermined timing has arrived and receive content-related information from the server in response to sending the related information request to the server. The printer may execute a matching process of matching the contents of a first table with contents of the second table by using the content-related information in a case where the content-related information is received from the server.

12 Claims, 21 Drawing Sheets

FIG. 2

User Table 38

| User ID | Password | Account Information |
|---|---|---|
| U1 | P1 | AI1 |
| U2 | P2 | AI2 |
| ... | ... | ... |

Accumulation Table 40

| Account Information | Job ID | Print Condition Information | Print Data | |
|---|---|---|---|---|
| AI1 | job11 | C11 (A4, Monochrome) | PD11 | 40A |
| AI2 | job12 | C12 (A4, Color) | PD12 | 40B |
| AI1 | job13 | C13 (A3, Color) | PD13 | 40C |
| ... | ... | ... | ... | |

History Table 42

| Job ID | Print Status |
|---|---|
| job1 | Printed |
| job2 | Canceled |
| ... | ... |

Account Table 138

| Account Information | Printer Information (Printer Name, Device ID) | Token | Authority | |
|---|---|---|---|---|
| AI1 | PI1 (pr1, dv1) | tk1 | Owner | 138A |
| AI2 | PI1 (pr1, dv1) | tk1 | Share | 138B |
| ... | ... | ... | ... | |

Job Table 140

| Job ID | Device ID | Account Information | Ticket URL | Data URL | Job Status | |
|---|---|---|---|---|---|---|
| job11 | dv1 | AI1 | tURL11 (A4, Monochrome) | iURL11 | Waiting for Printing | J11 |
| job12 | dv1 | AI2 | tURL12 (A4, Color) | iURL12 | Waiting for Printing | J12 |
| job13 | dv1 | AI1 | tURL13 (A3, Color) | iURL13 | Waiting for Printing | J13 |
| ... | ... | ... | ... | ... | ... | |

Job Information

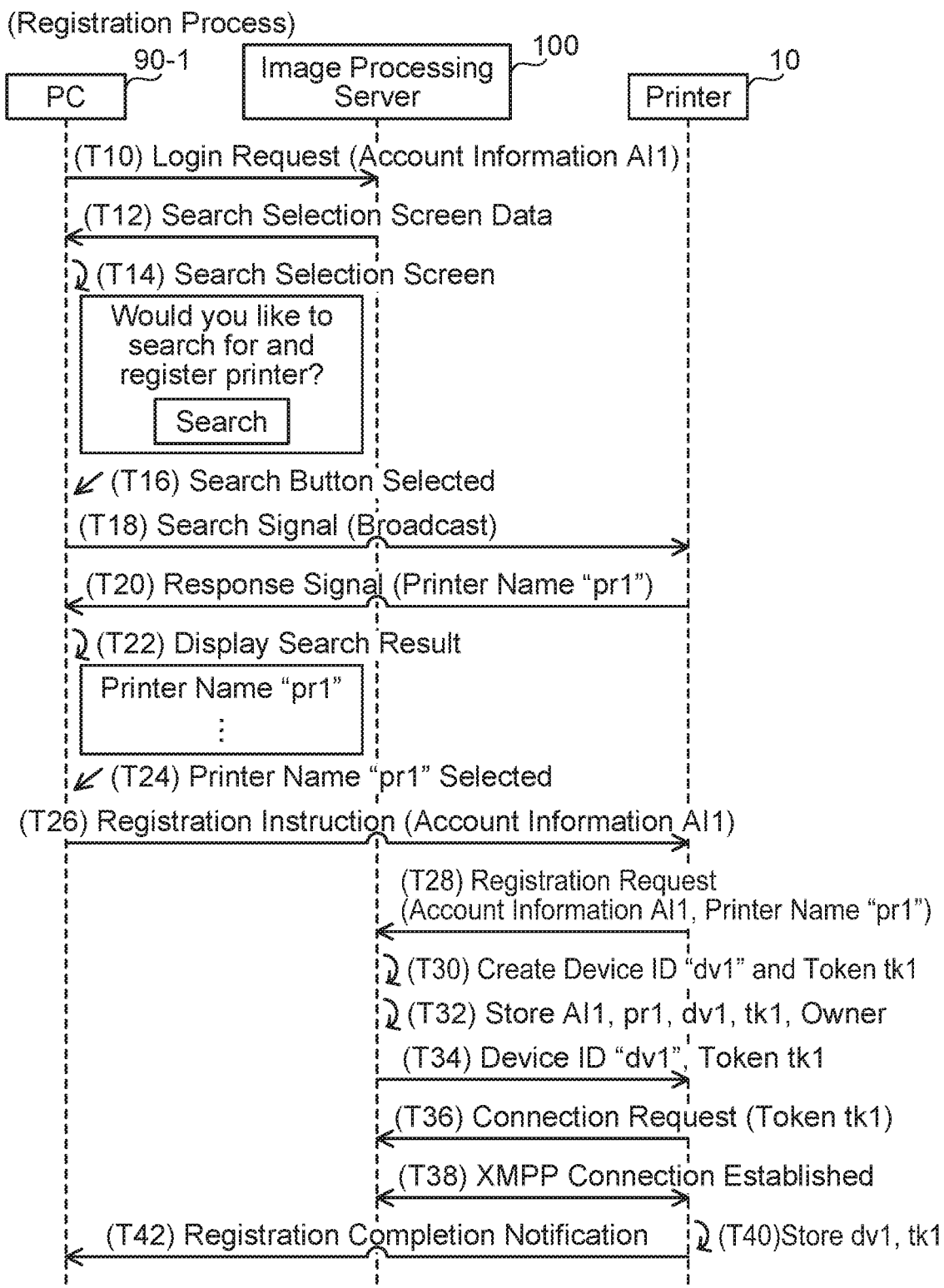

FIG. 11

(Case C1)

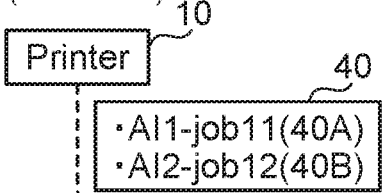

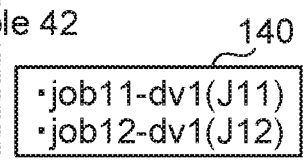

- AI1-job11(40A)
- AI2-job12(40B)

- job11-dv1(J11)
- job12-dv1(J12)

Same as T410 to T426 of FIG. 10

Print Completion Notification (Job ID "job11") ✕

(T530) Add "job11-Printed" in History Table 42

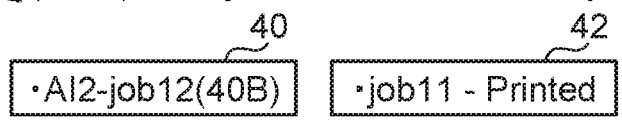

- AI2-job12(40B) | job11 - Printed

- job11-dv1(J11)
- job12-dv1(J12)

PC

Same as T210 to T230 of FIG. 5

(T532) Job Notification (job 13)

(T534) Job List Request (Device ID "dv1")

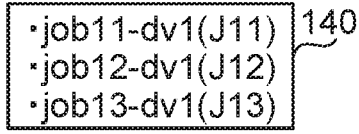

- job11-dv1(J11)
- job12-dv1(J12)
- job13-dv1(J13)

(T536) Job List (job 11, job 12, job13)

(T538) Print Completion Notification (Job ID "job11")

(T550) Job Request (Job ID "job13")

(T540) Update Job Information J11

(T552) AI1, tURL13, iURL13

- job12-dv1(J12)
- job13-dv1(J13)

(T554) Print Condition Information Request (Ticket URL "tURL13")

(T556) Print Condition Information C13 (A3, Color)

(T558) Print Data Request (Data URL "iURL13")

(T560) Print Data PD13

(T562) Store AI1, job13, C13, PD13

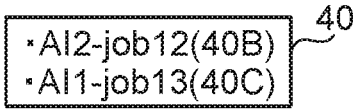

- AI2-job12(40B)
- AI1-job13(40C)

PRINTER AND NON-TRANSITORY COMPUTER-READABLE RECORDING MEDIUM STORING COMPUTER-READABLE INSTRUCTIONS FOR PRINTER

CROSS-REFERENCE TO RELATED APPLICATION

This application claims priority to Japanese Patent Application No. 2019-055239, filed on Mar. 22, 2019 and Japanese Patent Application No. 2019-055369, filed on Mar. 22, 2019, the entire contents of which are hereby incorporated by reference into the present application.

TECHNICAL FIELD

The present disclosure discloses a technique related to a printer that receives print data from a server.

BACKGROUND ART

A printing system including a printer, a PC, and a mediation server is known. Upon receiving a print execution request including image data from the PC, the mediation server creates a job ID, and stores the created job ID. Then, the mediation server sends, to the printer, a storage notification indicating that the mediation server has stored the image data. Upon receiving the storage notification, the printer sends, to the mediation server, a ticket request that requests sending or the job ID and the image data, and receives the job ID and the image data from the mediation server. Then, the printer stores the job ID and the image data.

SUMMARY

In the aforementioned printing system, a situation may occur in which the job ID stored in the mediation server and the job ID stored in the printer do not match. The present disclosure discloses a technique for matching contents in a first table to which information is stored by the server with contents in a second table to which information is stored by the printer.

A printer disclosed herein may comprise: a communication interface; a processor; and a memory storing computer-readable instructions therein, wherein the computer-readable instructions, when executed by the processor, cause the printer to: receive print data corresponding to a print target image and data identification information identifying the print data from a server via the communication interface, wherein in a case where a print request for causing the printer to execute printing of the print target image is received from a terminal device, the server stores data-related information related to the print data and the data identification information in a first table in association with each other, and sends the print data and the data identification information to the printer; in a case where the print data and the data identification information are received from the server, store target data obtained by using the print data and the data identification information in a second table in association with each other; in a case where a predetermined timing has arrived, send a related information request to the server via the communication interface, the related information request being a signal for requesting the server to send content-related information related to contents in the first table; receive the content-related information from the server via the communication interface in response to sending the related information request to the server; and in a case where the content-related information is received from the server, execute a matching process of matching the contents of the first table with contents of the second table by using the content-related information.

A control method and a computer program for implementing the above printer, and a computer-readable medium storing the computer program are also novel and useful. Moreover, a communication system comprising the above printer and server is also novel and useful.

BRIEF DESCRIPTION OF THE DRAWINGS

FIG. 2 shows tables.
FIG. 3 shows a sequence diagram of a registration process.
FIG. 11 shows a sequence diagram of case C1 in which sending of a print completion notification from the printer to the server fails.

EMBODIMENTS

First Embodiment

Figure 1:
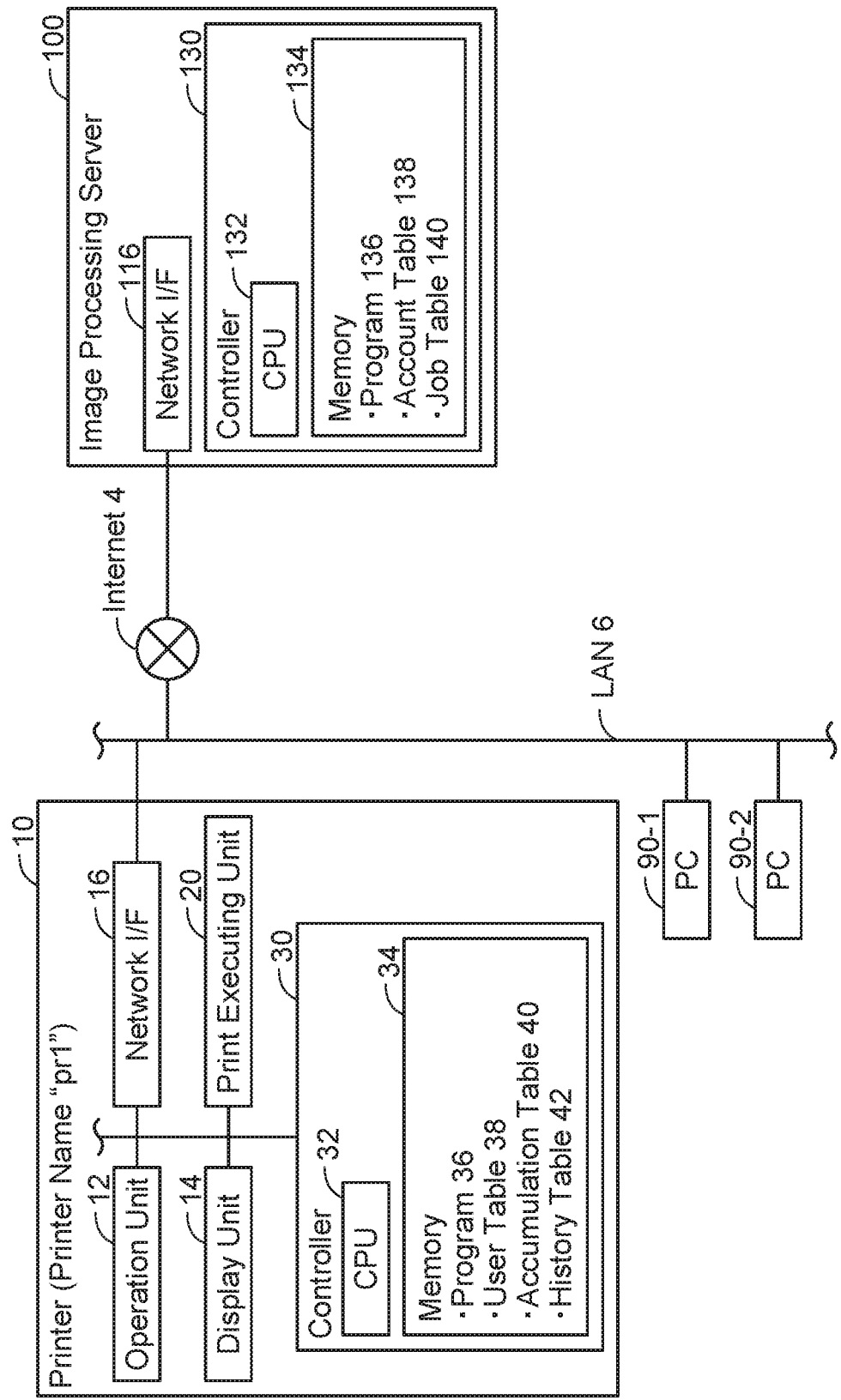
FIG. 1 shows a configuration of a communication system.

Configuration of Communication System 2; FIG. 1

As shown in FIG. 1, a communication system 2 comprises a printer 10, a plurality of PCs 90-1, 90-2, and an image processing server (hereinbelow simply termed "server") 100. The printer 10, the PC 90-1, and the PC 90-2 are connected with the Internet 4 via a LAN 6. The server 100 is connected with the Internet 4. Consequently. the printer 10, the PC 90-1, and PC 90-2 are capable of communicating with the server 100 via the Internet 4. Hereinbelow, the plurality of PCs 90-1, 90-2 may collectively be termed "PC 90".

Configuration of Printer 10

The printer 10 is a peripheral device capable of executing a print function (that is, a peripheral device of the PC 90 and the like). The printer 10 may be a multi-function device capable of executing a scan function, a FAX function and the like, in addition to the print function. The printer 10 comprises an operation unit 12, a display unit 14, a network interface (hereinbelow, interface is termed "I/F") 16, a print executing unit 20, and a controller 30. A printer name "pr1" is assigned to the printer 10.

The operation unit 12 comprises a plurality of keys. A user can input various instructions to the printer 10 by operating the operation unit 12. The display unit 14 is a display for displaying various types of information. The network I/F 16 is connected to the LAN 6. The network I/F 16 may be a wireless I/F, or may be a wired I/F. The print executing unit 20 comprises a printing mechanism of an ink jet scheme, laser scheme or the like.

The controller 30 comprises a CPU 32 and a memory 34. The CPU 32 is configured to execute various processes in accordance with a program 36 stored in the memory 34. The memory 34 is constituted of a volatile memory, a non-volatile memory, and the like. The memory 34 further stores a user table 38 (see FIG. 2), an accumulation table 40 (see FIG. 2), and a history table 42 (see FIG. 2).

Configuration of PC 90-1, 90-2 and the Like

The PCs 90-1, 90-2 do not comprise a printer driver for causing the printer 10 to execute printing. Further, the PCs 90-1, 90-2 each comprise a browser program (not shown) such as Google Chrome (registered trademark). In the present embodiment, the PCs 90-1, 90-2 are each a stationary terminal device (for example, a desktop PC). However, in a variant, the PCs 90-1, 90-2 may each be a portable terminal device such as a cellphone (e.g., a smartphone), a PDA, a notebook PC, a tablet PC.

Configuration of Image Processing Server 100

The server 100 is a server installed on the Internet and is, for example, a Google Cloud Print (GCP) server provided by Google (registered trademark). In a variant, the server 100 may be a server provided, for example, by a vendor of the printer 10. The server 100 is a server that mediate printing between the printer 10 and the PC 90. That is, the server 100 converts an image file submitted from the PC 90 to create print data having a data format that can be interpreted by the printer 10, and sends this print data to the printer 10. Therefore, even when the PC 90 does not comprise a printer driver for converting an image file into print data, it is possible to cause the printer 10 to execute printing by the PC 90 submitting an image file to the server 100. Each user of the printer 10 registers his/her account information (for example, Google Account) in advance in the server 100.

The server 100 comprises a network I/F 116 and a controller 130. The network I/F 116 is connected to the Internet 4. The controller 130 comprises a CPU 132 and a memory 134. The CPU 132 is configured to execute various processes in accordance with a program 136 stored in the memory 134. The memory 134 further stores an account table 138 (see FIG. 2) and a job table 140 (see FIG. 2).

Contents of Tables 38, 40, 42, 138, 140; FIG. 2

Next contents of the tables 38, 40, 42 in the printer 10, and contents of the tables 138. 140 in the server 100 will be described with reference to FIG. 2.

The tables 38, 40, 42 in the printer 10 are in an empty state when the printer 10 is shipped. In the user table 38, user ID, password, and account information are associated with one another. The user ID and the password are information used for a user to log in to the printer 10. The account information is information used for the user to log in to the server 100. The information in the user table 38 is registered by an administrator of the printer 10.

In the accumulation table 40, account information, job ID, print condition information, and print data are associated with one another. The job ID is information for identifying the print data, and is created by the server 100. The print condition information is information indicating a condition for printing (for example, a paper size and the number of colors). The information in the accumulation table 40 is stored in a matching process of FIG. 7, which is to be described later.

In the history table 42, job ID and print status are associated with each other. The print status indicates either of information "printed", which indicates that printing using the print data corresponding to the job ID associated with this print status has been executed, or information "canceled", which indicates that printing using this print data has been canceled.

Next, the tables 138, 140 in the server 100 will be described. In the account table 138, account information, printer information, token, and authority information are associated with one another. The printer information includes a printer name and a device ID. The device ID is information for the server 100 to identify the printer 10. The token is authentication information (specifically, an access token) used for the printer 10 to execute communication with the server 100. The authority information is information that indicates either of "Owner" or "Share". "Owner" indicates that it is authorized to associate the printer information, which is associated with this authority information, with a new user (that is, a share user). "Share" indicates that it is not authorized to associate the printer information, which is associated with this authority information, with a new user. The information in the account table 138 is stored in a registration process of FIG. 3 and FIG. 4, which is to be described later.

In the job table 140, job ID, device ID, account information, ticket URL, data URL, and job status are associated with one another. The ticket URL is a URL that indicates a location in the server 100 where the print condition information corresponding to the job ID associated with this ticket URL is stored. The data URL is a URL that indicates a location in the server 100 where the print data corresponding to the job ID associated with this data URL is stored. The job status indicates information which is any of "waiting for printing", which indicates waiting for printing using the print data associated with this job status to be executed; "printed", which indicates that printing using the print data has been executed; and "canceled", which indicates that printing using the print data has been canceled. Below, the job ID, the device ID, the account information, the ticket URL, the data URL, and the job status may be collectively referred to as job information. The information in the job table 140 is stored in a submit process of FIG. 5, which is to be described later.

Registration Process; FIG. 3

Next, a registration process will be described with reference to FIG. 3. The registration process is a process in which the account information corresponding to the authority information "Owner" and information related to the printer 10 are registered in association with each other in the server 100. In FIG. 3, the printer 10 is registered in the server 100. In an initial state of FIG. 3, account information AI1 for identifying a user of the PC 90-1 (hereinbelow termed "first user") has been already registered in the server 100. Hereinbelow, to facilitate understanding, operations which CPUs of the respective devices (for example, the CPU 32 of the printer 10) execute may be described with the devices (for example, the printer 10) as subjects of action, instead of describing the CPUs as the subjects of action. Further, all communication executed by the printer 10, the server 100 are via the network I/Fs 16, 116, respectively. As such, hereinbelow, a phrase "via the network I/F 16 (or 116)" is omitted. Further, below-described processes executed by the PC 90-1 are executed according to the browser program. As such, hereinbelow, a phrase "according to the browser program" is omitted.

Upon receiving input of the account information AI1 and an instruction to log in to the server 100 from the first user, the PC 90-1 sends a login request including the account information AI1 to the server 100 in T10.

Upon receiving the login request from the PC 90-1 in T10, the server 100 determines that the account information AI1 included in this login request has been already registered therein, and sends search selection screen data to the PC 90-1 in T12.

Upon receiving the search selection screen data from the server 100 in T12, the PC 90-1 displays a search selection screen in T14. This screen includes a search button and a message that checks whether to search for and register a printer existing in the surroundings of the PC 90-1. Upon receiving selection of the search button in the search selection screen from the first user in T16, the PC 90-1 sends a search signal by broadcast to the LAN 6 in T118. The search signal is repeatedly sent for a predetermined period.

Upon receiving the search signal from the PC 90-1 in T18, the printer 10 sends a response signal including the printer name "pr1" to the PC 90-1 in T20.

Upon receiving the response signal from the printer 10 in T20, the PC 90-1 displays a search result including the primer name "pr1" included in the response signal in T22. Upon receiving selection of the printer name "pr1" included in the search result from the first user in T24, the PC 90-1 sends, to the printer 10, a registration instruction including the logged-in account information AI1 which is currently logging in to the server 100 in T26. The registration instruction is a command instructing the printer 10 to register in the server 100.

Upon receiving the registration instruction from the PC 90-1 in T26, the printer 10 sends, to the server 100, a registration request including the account information AI1 included in the registration instruction and the printer name "pr1" of the printer 10 in T28. The registration request is a command requesting the server 100 to register the printer 10.

Upon receiving the registration request from the printer 10 in T28, the server 100 creates a device ID "dv1" and a token tk1 in T30. The server 100 creates the unique device ID "dv1" and token tk1 that do not overlap device ID(s) and token(s) created in the past. Then, in T32, the server 100 stores the account information AI1, the printer name "pr1", the device ID "dv1", the token tk1, and the authority information "Owner" in association with each other in the account table 138 in the memory 134 (see reference sign 138A of FIG. 2). Here, the server 100 stores the printer name "pr1" and the device ID "dv1" as printer information PI1. Next, in T34, the server 100 sends the device ID "dv1" and the token tk1 to the printer 10.

Upon receiving the device "dv1" and the token tk1 from the server 100 in 134, the printer 10 sends a connection request including the token tk1 to the server 100 in 136. The connection request is a command requesting the server 100 to establish an Extensible Messaging and Presence Protocol (XMPP) connection, which is a so-called always-on connection.

Upon receiving the connection request from the printer 10 in 136, the server 100 determines that the token tk1 included in this connection request has been already stored in the account table 138 (that is, authentication using the token tk1 succeeds), and establishes an XMPP connection with the printer 10 in T38. When the XMPP connection is established, the server 100 can use the XMPP connection to send a signal (for example, a job notification of T232 of FIG. 5, which is to be described later) to the printer 10 traversing a firewall of the LAN 6, even without receiving a signal from the printer 10.

In T40, the printer 10 stores the device ID "dv1" and the token tk1 in the memory 34. Then, in T42, the printer 10 sends a registration completion notification to the PC 90-1. The registration completion notification is information indicating that registration of the printer 10 in the server 100 has been completed. Thereby, the first user can be aware that the registration of the printer 10 in the server 100 has been completed. When T42 is completed, the registration process ends. In subsequent processes, the token tk1 is included in all signals sent from the printer 10 to the server 100, and authentication is executed in the server 100 by using the token tk1. As such, descriptions and drawings thereof are omitted for the subsequent processes.

Figure 4:
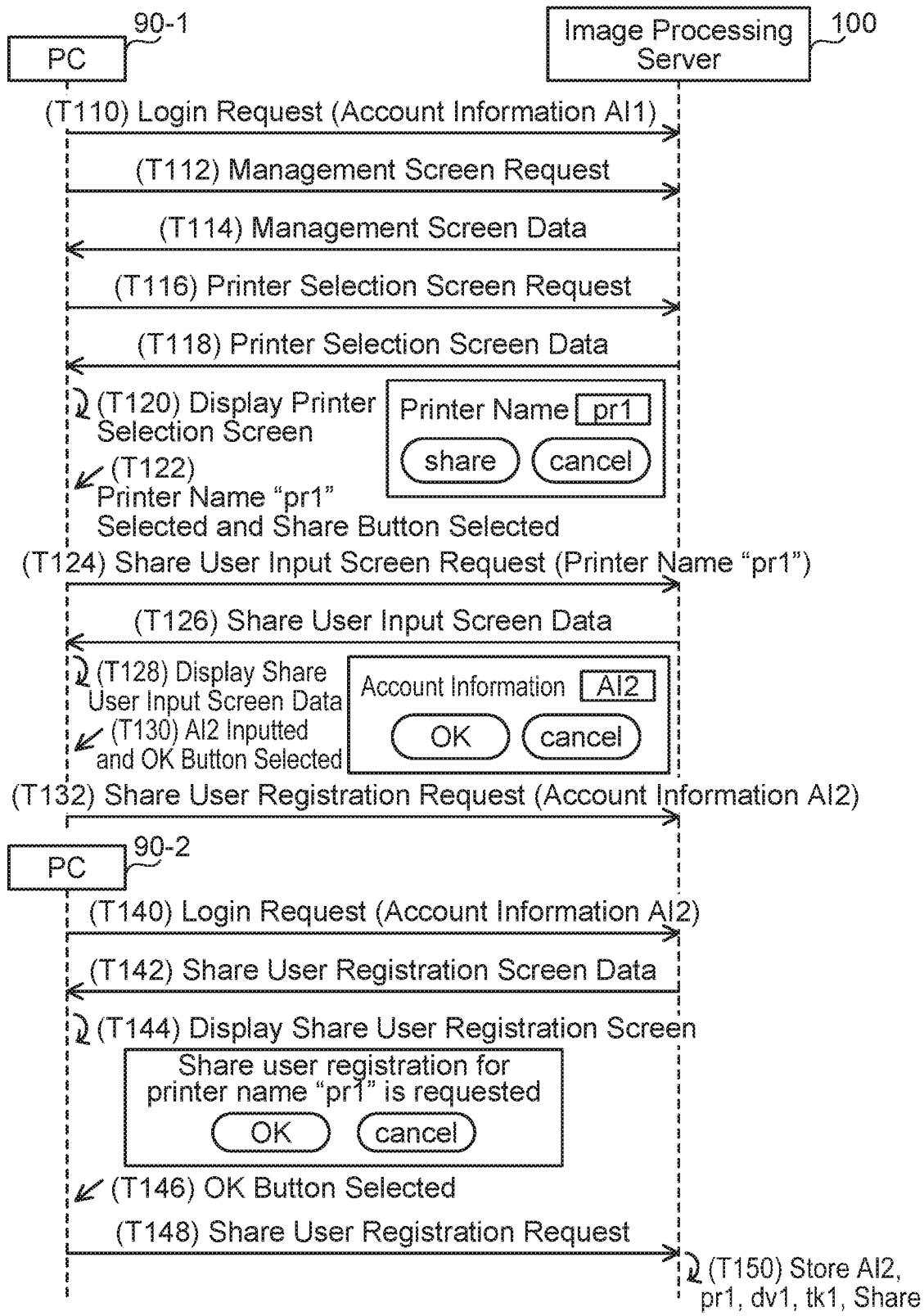
FIG. 4 shows a sequence diagram of a share user registration process.

Share User Registration Process: FIG. 4

Next, a share user registration process will be described with reference to FIG. 4. The share user registration process is a process in which the account information corresponding to the authority information "Share" and the information of the printer 10 are registered in association with each other in the server 100. An initial state of FIG. 4 is a state after FIG. 3. Further, account information AI2 for identifying a user of the PC 90-2 (hereinbelow termed "second user") has been already registered in the server 100.

T110 is the same as T10 of FIG. 3. The PC 90-1 sends a management screen request to the server 100 in T112, and receives management screen data from the server 100 in T114. In this case, although not shown, the PC 90-1 displays a management screen corresponding to the management screen data. The management screen includes a printer selection button. Upon receiving selection of the printer selection button included in the management screen from the first user, the PC 90-1 sends a printer selection screen request to the server 100 in T116, receives printer selection screen data from the server 100 in T118, and displays a printer selection screen in T120. This screen includes a printer selection field, a share button, and a cancel button. A list of printer names associated with the account information AI1 and the authority information "Owner" in the account table 138 of the server 100 is displayed in the printer selection field.

Upon receiving selection of the printer name "pr1" and selection of the share button from the first user in T122, the PC 90-1 sends a share user input screen request including the printer name "pr1" to the server 100 in T124. Then, the PC 90-1 receives share user input screen data from the server 100 in T126, and displays a share user input screen in T128. This screen includes an account information input field, an OK button, and a cancel button. The account information of a user to be registered as a share user is inputted to the account information input field.

Upon receiving input of the account information AI2 to the account information input field and selection of the OK button from the first user in T130, the PC 90-1 sends a share user registration request including the account information AI2 to the server 100 in T132.

Upon receiving the share user registration request from the PC 90-1 in T132, the server 100 determines that adding the user corresponding to the account information AI2 as the share user is being requested, and monitors a login with the account information AI2.

Thereafter, upon receiving input of the account information AI2 and an instruction to log in to the server 100 from the second user, the PC 90-2 sends a login request including the account information AI2 to the server 100 in T140.

Upon receiving the login request from the PC 90-2 in T140, the server 100 determines that this login request includes the account information AI2, and sends share user registration screen data to the PC 90-2.

Upon receiving the share user registration screen data from the server 100 in T142, the PC 90-2 displays a share user registration screen in T144. This screen includes a message indicating that share user registration for the printer name "pr1" is requested, an OK button, and a cancel button. Upon receiving selection of the OK button from the second user in T146, the PC 90-2 sends a share user registration request to the server 100 in T148.

Upon receiving the share user registration request from the PC 90-2 in T148, the server 100 stores the account information AI2, the printer information PI1 corresponding to the printer 10 (that is, the printer name "pr1", the device ID "dv1"), the token tk1, and the authority information "Share" in association with each other in the account table 138 in T150 (see reference sign 138B of FIG. 2).

Figure 5:
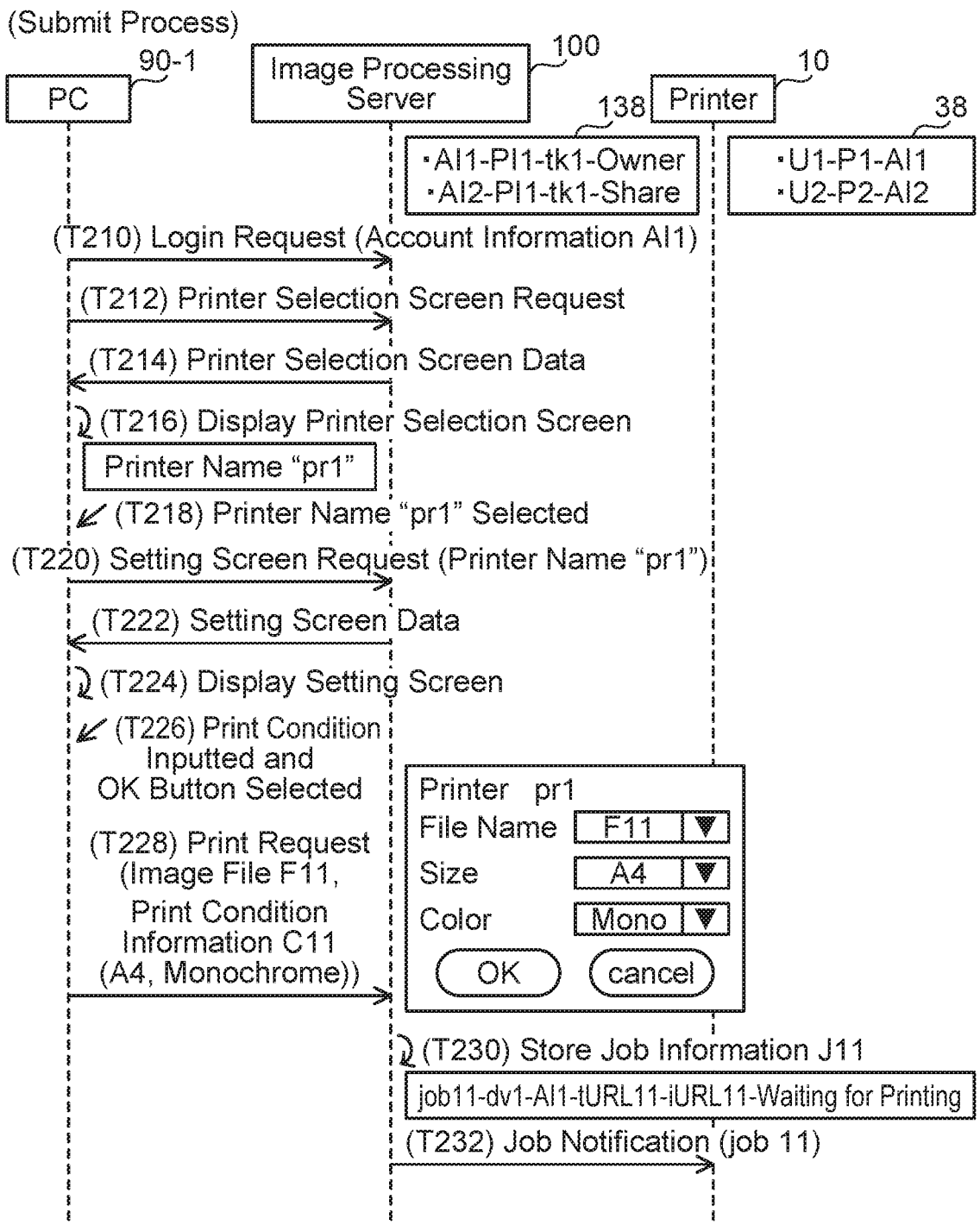
FIG. 5 shows a sequence diagram of a submit process.

Submit Process; FIG. 5

Next, a submit process, in which the first user submits an image file F11 to the server 100, will be described with reference to FIG. 5. FIG. 5 is a state after FIG. 4, and the information 138A corresponding to the account information AI1 and the information 138B corresponding to the account information AI2 are already stored in the account table 138 of the server 100. Further, the information corresponding to a user ID "U1", and the information corresponding to a user ID "U2" are already stored in the user table 38 of the printer 10.

T210 is the same as T10 of FIG. 3. The PC 90-1 sends a printer selection screen request to the server 100 in T212, receives printer selection screen data from the server 100 in T214, and displays a printer selection screen in T216. This screen displays the printer name "pr1" associated with the account information AI1 in the account table 138 of the server 100. Upon receiving selection of the printer name "pr1" of the printer 10 from the first user in T218, the PC 90-1 sends a setting screen request including the printer name "pr1" to the server 100 in T220, receives setting screen data from the server 100 in T222, and displays a setting screen in T224. This screen includes a file selection field for selecting an image file, a size selection field for selecting a paper size, the number of colors selection field for selecting the number of print colors, an OK button, and a cancel button.

Upon receiving input of a print condition (that is, selection of an image file F11, paper size "A4", and number of print colors "monochrome") and selection of the OK button from the first user in T226, the PC 90-1 sends a print request including the image file F11 and print condition information C11 (that is, the paper size "A4", the number of print colors "monochrome") to the server 100 in T228. The print request is a command requesting the printer 10 to execute printing of an image corresponding to the image file F11.

Upon receiving the print request from the PC 90-1 in T228, the server 100 converts the image file F11 in this request into print data PD11 according to a Printer Working Group (PWG) raster format. The server 100 may convert the image file F11 in the print request according to Portable Document Format (PDF) format. Generally speaking, the server 100 may convert the image file F11 in the print request into data having a format that can be interpreted by the printer 10. Next, the server 100 creates a job ID "job11" identifying the print data PD11, and stores, in the memory 134, the converted print data PD11 and the print condition information C11 in the print request. Then, the server 100 specifies the device ID "dv1" associated with the printer name "pr1" in the account table 138, and stores the created job ID "job11", the specified device ID "dv1", the account information AI1 of the logged-in user, a ticket URL "tURL11" indicating a location where the print condition information C11 is stored, a data URL "iURL11" indicating a location where the print data PD11 is stored, and the job status "waiting for printing", as job information J11 in the job table 140 in T230 (see FIG. 2). Then, the server 100 sends a job notification to the printer 10 by using the XMPP connection (see T38 of FIG. 3) in T232. The job notification is information for notifying the printer 10 that the job information J11 has been stored.

Figure 6:
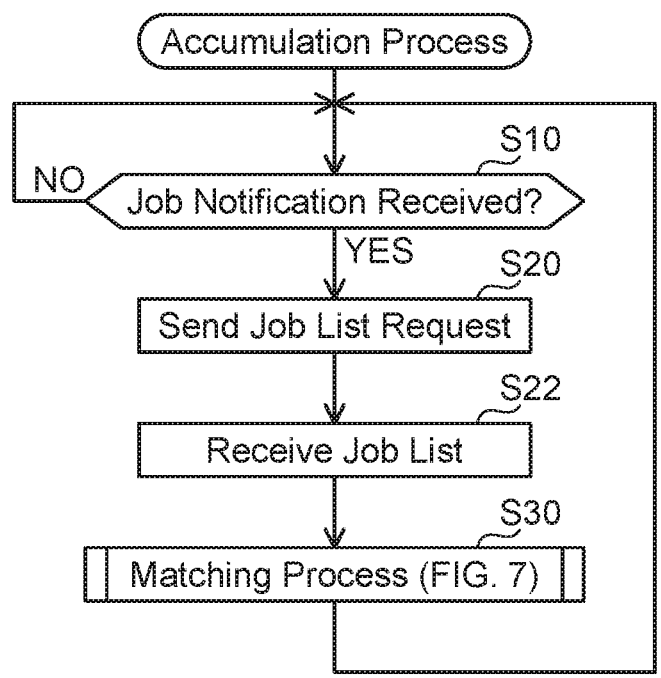
FIG. 6 shows a flowchart of an accumulation process.

Accumulation Process; FIG. 6

Next, an accumulation process executed by the CPU 32 of the printer 10 will be described with reference to FIG. 6. The CPU 32 starts the process of FIG. 6 in a case where the registration of the information of the printer 10 in the server 100 has been completed by means of the registration process of FIG. 3.

In S10, the CPU 32 monitors reception of the job notification from the server 100. In a case where the job notification is received, the CPU 32 determines YES in S10, and proceeds to S20.

In S20, the CPU 32 sends a job list request including the device ID "dv1" in the memory 34 to the server 100. The job list request is a signal for requesting sending of a job list that includes job ID(s) associated with the device ID "dv1" in the job list request and the job status "waiting for printing" in the job table 140 of the server 100. In S22, the CPU 32 receives the job list from the server 100.

In S30, the CPU 32 executes a matching process (FIG. 7) by using the accumulation table 40 in the memory 34 and the job list received in S22. The matching process is a process for matching the contents of the accumulation table 40 with the contents of the job table 140. Upon completing the process of S30, the CPU 32 returns to S10.

Figure 7:
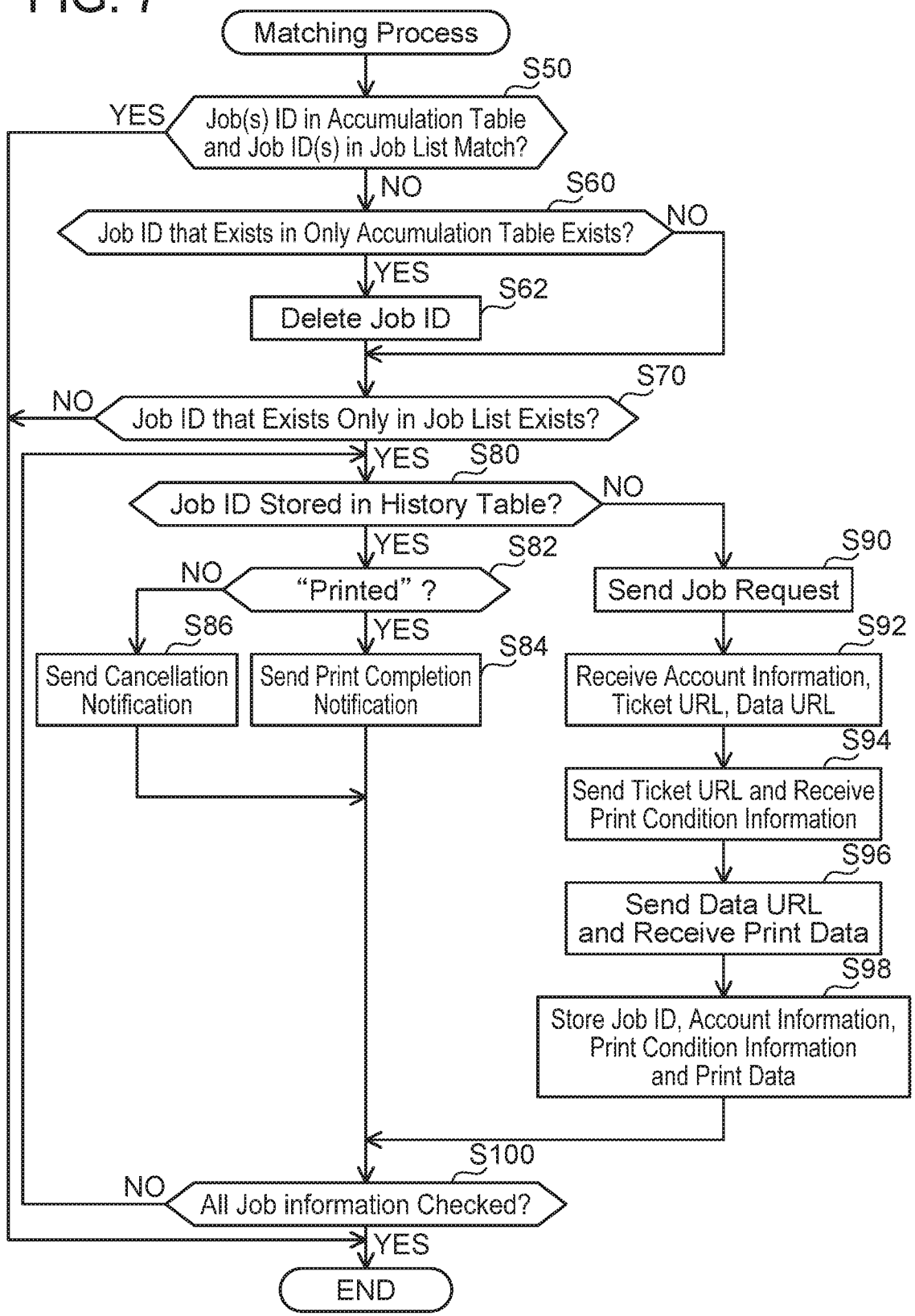
FIG. 7 shows a flowchart of a matching process.

Matching Process; FIG. 7

Next, the matching process executed in S30 of FIG. 6 will be described. The matching process is a process for matching the contents of the accumulation table 40 with the contents of the job table 140. Here, the contents of the accumulation table 40 matching the contents of the job table 140 means that job ID(s) in the accumulation table 40 matches job ID(s) associated with the device ID "dv1" and the job status "waiting for printing" in the job table 140 of the server 100, or means that no job ID is stored in the accumulation table 40 and no job ID is stored in association with the device ID "dv1" and the job status "waiting for printing" in the job table 140.

In S50, the CPU 32 determines whether job ID(s) in the accumulation table 40 matches the job ID(s) in the job list received in S22 of FIG. 6. In a case where the job ID(s) in the accumulation table 40 matches the job ID(s) in the received job list (YES in S50), the CPU 32 ends the process of FIG. 7. The case in which the job ID(s) in the accumulation table 40 matches the job ID(s) in the received job list is a case in which all the job IDs in the accumulation table 40 match all the job IDs in the received job list, or a case in which no job ID is stored either in the accumulation table 40 or in the received job list. On the other hand, in a case where the job ID(s) in the accumulation table 40 does not match the job ID(s) in the received job list (NO in S50), the CPU 32 proceeds to S60. The case in which the job ID(s) in the accumulation table 40 does not match the job ID(s) in the received job list is a case in which there exists a job ID that is included in the accumulation table 40 but is not included in the received job list (hereinbelow termed "Printer only (PO) job ID"), or a case in which there exists a job ID that is included in the received job list but is not included in the accumulation table 40 (hereinbelow termed "Server only (SO) job ID").

In S60, the CPU 32 determines whether one or more PO job IDs exist. The CPU 32 determines YES in S60 and proceeds to S62 in a case where one or more PO job IDs exist, while it determines NO in S60 and proceeds to S70 in a case where no PO job ID exists.

In S62, the CPU 32 deletes the one or more PO job IDs and the information corresponding to the one or more PO job IDs in the accumulation table 40 (that is, the account information, the print condition information, the print data).

In S70, the CPU 32 determines whether one or more SO job IDs exist. The CPU 32 determines YES in S70 and proceeds to S80 in a case where one or more SO job IDs exist. while it determines NO in S70 and ends the process in a case where no SO job ID exists.

In S80, the CPU 32 specifies the SO job ID(s). In a case of specifying a plurality of SO job IDs, the CPU 32 specifies one SO job ID as a target SO job ID from among the plurality of specified SO job IDs. In a case of specifying one SO job ID, the CPU 32 specifies this one SO job ID as a target SO job ID. Then, the CPU 32 determines whether a job ID that matches the target SO job ID is stored in the history table 42. The CPU 32 proceeds to S82 in a case of determining that a job ID matching the target SO job ID is stored in the history table 42 (YES in S80). On the other hand, the CPU 32 proceeds to S90 in a case of determining that a job ID matching the target SO job ID is not stored in the history table 42 (NO in S80).

In S82, the CPU 32 determines whether the job status corresponding to the target SO job ID in the history table 42 is "printed". The CPU 32 proceeds to S84 in a case where the print status corresponding to the target SO job ID in the history table 42 is "printed" (YES in S82). On the other hand, the CPU 32 proceeds to S86 in a case where the print status corresponding to the target SO job ID in the history table 42 is "canceled" (NO in S82).

In S84, the CPU 32 sends a print completion notification including the target SO job ID to the server 100. The print completion notification is a notification indicating that printing using the print data corresponding to the job ID in this notification has been completed. In a case of receiving the print completion notification, the server 100 changes the job status corresponding to the job ID in this notification from "waiting for printing" to "printed". Further, in the job table 140, the server 100 deletes the information corresponding to the received job ID (the ticket URL, the print condition information, the data URL, the print data).

In S86, the CPU 32 sends a cancellation notification including the target SO job ID to the server 100. The cancellation notification is a notification indicating that printing using the print data corresponding to the job ID in this notification has been canceled. In a case of receiving the cancellation notification, the server 100 changes the job status corresponding to the job ID in this notification from "waiting for printing" to "canceled". Further, in the job table 140. the server 100 deletes the information corresponding to the received job ID (the ticket URL, the print condition information, the data URL, the print data).

In the case where the CPU 32 determines NO in S80, the CPU 32 sends a job request including the target SO job ID to the server 100 in S90. The CPU 32 receives account information, a ticket URL, and a data URL associated with the target SO job ID from the server 100 in S92.

In S94, the CPU 32 sends the ticket URL received in S92 to the server 100, and receives print condition information corresponding to this ticket URL from the server 100. Next, in S96, the CPU 32 sends the data URL received in S92 to the server 100, and receives print data corresponding to this data URL from the server 100.

In S98, the CPU 32 stores the target SO job ID, the account information received in S92, the print condition information received in S94, and the print data received in S96 in association with each other in the accumulation table 40.

In S100, the CPU 32 determines whether the processes of S80 to S98 have been executed for all the specified SO job IDs. In a case of determining that the processes have been executed for not all the specified SO job IDs (NO in S100), the CPU 32 returns to S80 and specifies an SO job ID for which the processes have not yet been executed as the target SO job ID. On the other hand, in a case of determining that the processes have been executed for all the specified SO job IDs (YES in S100), the CPU 32 ends the process of FIG. 7.

Figure 8:
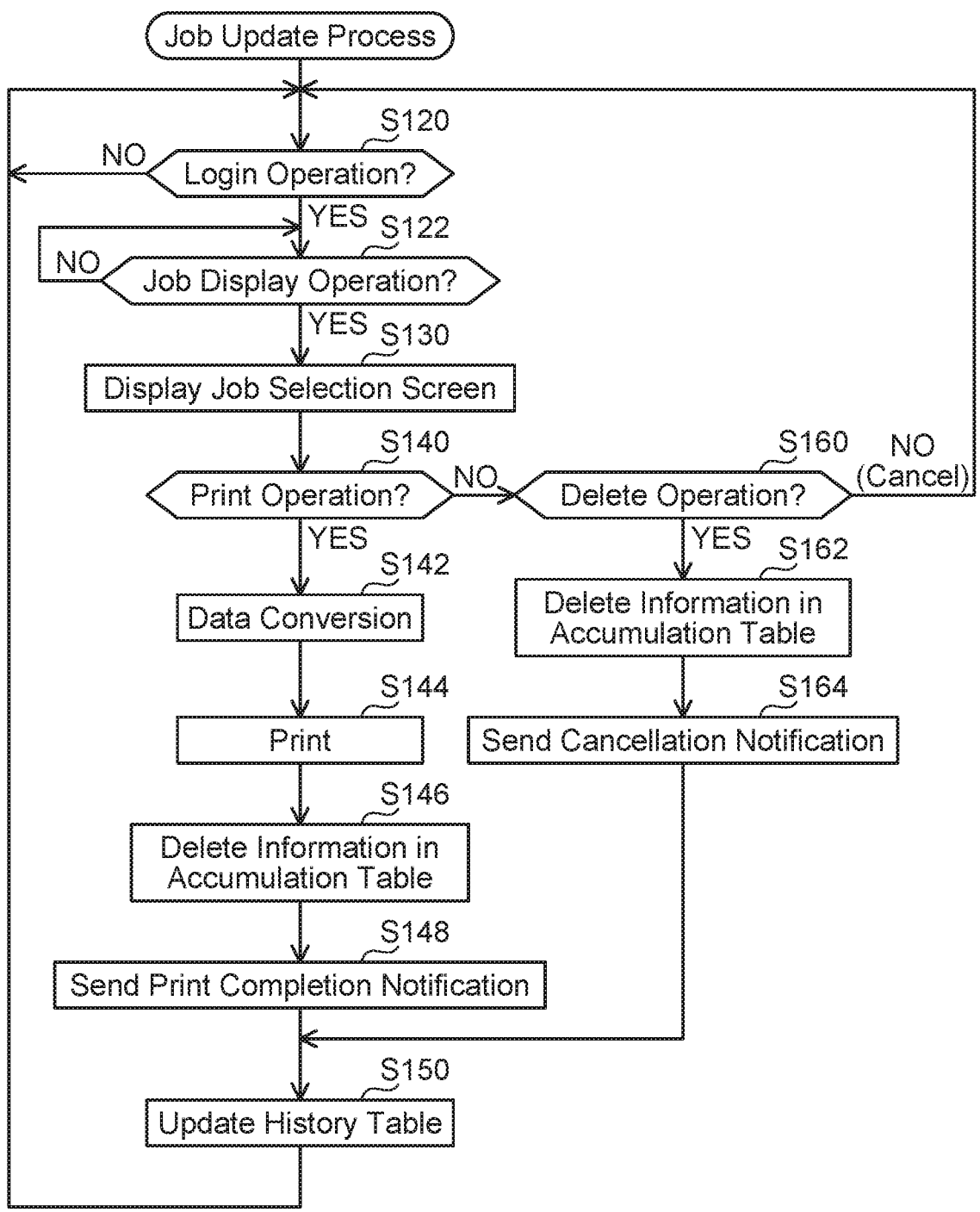
FIG. 8 shows a flowchart of a job update process.

Job Update Process; FIG. 8

Next, a job update process executed by the CPU 32 of the printer 10 will be described with reference to FIG. 8. The CPU 32 starts the process of FIG. 8 in a case where the registration of the information of the printer 10 in the server 100 is completed by means of the registration process of FIG. 3. The CPU 32 executes the process of FIG. 8 in parallel with the accumulation process of FIG. 6.

In S120, the CPU 32 monitors whether a login operation is executed. The login operation is an operation by which an user name and a password registered in the user table 38 (for example, U1 and P1 of FIG. 2) are inputted. In a case where the login operation is executed, the CPU 32 determines YES in S120, and proceeds to S122.

In S122, the CPU 32 monitors whether a job display operation is executed. The job display operation is an operation for displaying the job ID(s) stored in the accumulation table 40. In a case where the job display operation is executed, the CPU 32 determines YES in S122, and proceeds to S130.

Figure 10:
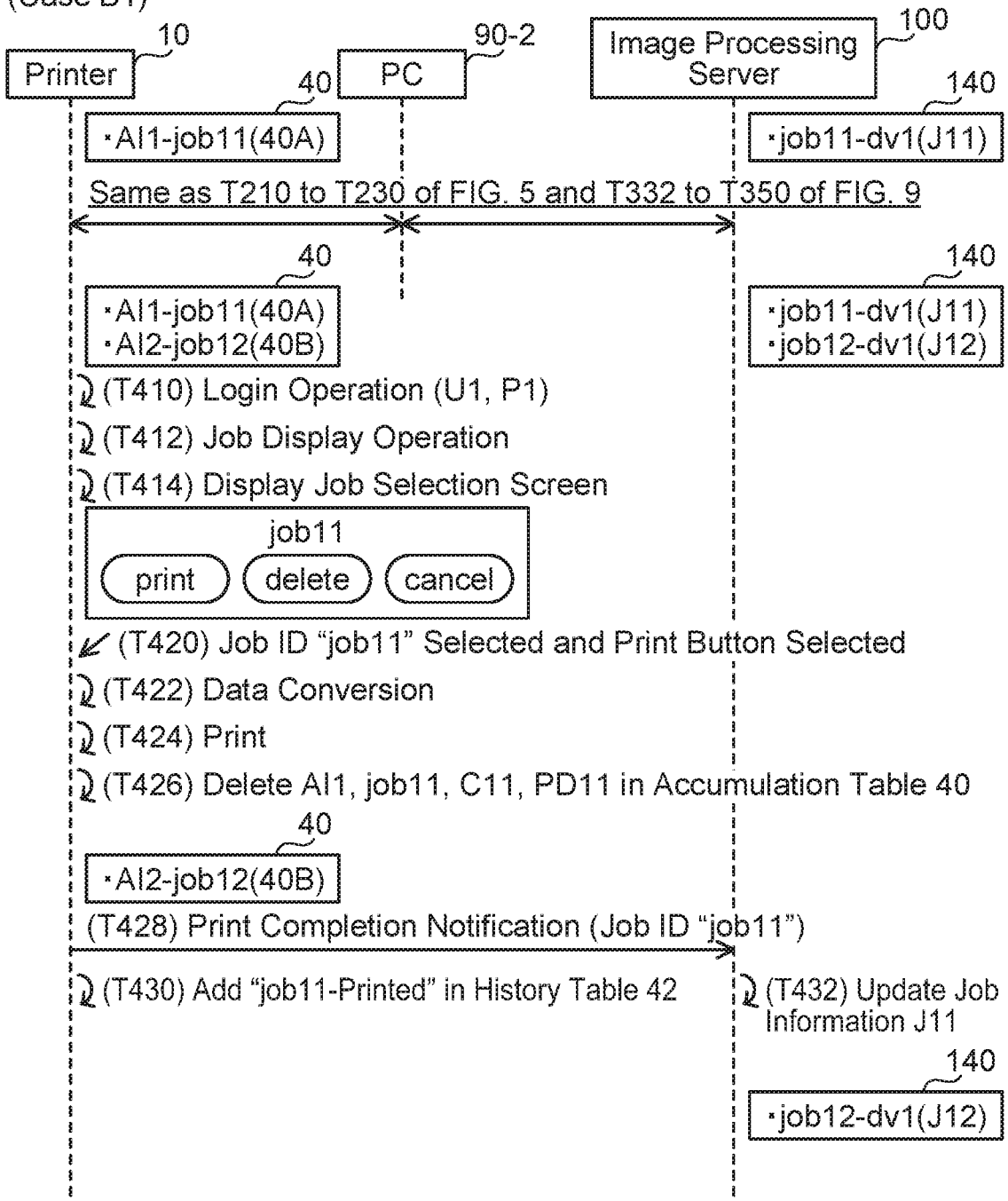
FIG. 10 shows a sequence diagram of case B1 in which printing is executed using print data in an accumulation table.

In S130, the CPU 32 displays a job selection screen on the display unit 14. The job selection screen is a screen for selecting a job ID of a print target. As shown in FIG. 10, this screen includes a list of the job ID(s) associated with the account information of the logged-in user front among the job IDs stored in the accumulation table 40, a print button, a delete button, and a cancel button.

In S140, the CPU 32 determines whether a print operation is executed. The print operation is an operation by which the print button is selected after the job ID has been selected in the job selection screen. In a case where the print operation is executed, the CPU 32 determines YES in S140, and proceeds to S142. On the other hand, in a case where an operation other than the print operation is executed (delete operation or cancellation operation), the CPU 32 determines NO in S140, and proceeds to S160.

In S142, the CPU 32 specifies the print data associated with the job ID selected in S140 in the accumulation table 40, and converts the specified print data to create converted print data. Specifically, in a case where the specified print data is print data according to the PWG raster format, the CPU 32 executes a color conversion process and a halftone process on this print data. The color conversion process is a process for converting multi-gradation RGB bitmap data into multi-gradation CMYK bitmap data. The halftone process is a process for converting multi-gradation CMYK bitmap data into relatively-small-gradation CMYK bitmap data. In a case where the specified print data is print data according to the PDF format, the CPU 32 executes, on this print data, a rasterization process for rasterizing this print data, the color conversion process, and the halftone process. The rasterization process is a process for converting vector format data into bitmap format data.

In S144, the CPU 32 causes the print executing unit 20 to execute printing according to the converted print data. Next, in S146, the CPU 32 deletes the selected job ID in the accumulation table 40 and the information associated with the selected job ID (the account information, the print condition information, and the print data). S148 is the same as S84 of FIG. 7.

In S150, the CPU 32 updates the history table 42. Specifically, in S150 after YES in S140, the CPU 32 stores the job ID selected in S140 and the print status "printed" in association with each other in the history table 42. Upon completing S150, the CPU 32 returns to S120.

In the case where the CPU 32 determines NO in S140, the CPU 32 determines whether a delete operation is executed in S160. The delete operation is an operation by which the delete button is selected after the job ID has been selected in the job selection screen. In a case where the delete operation is executed, the CPU 32 determines YES in S160, and proceeds to S162. On the other hand, in a case where a cancellation operation is executed, the CPU 32 determines NO in S160, and returns to S120. The cancellation operation is an operation by which the cancel button in the job selection screen is selected. S162 is the same as S146 except that the job ID selected in S160 is used. S164 is the same as S86. Upon completing S164, the CPU 32 proceeds to S150. In S150 after YES in S160, the CPU 32 stores the job ID selected in S160 and the print status "canceled" in association with each other in the history table 42.

Specific Cases

Next, specific cases A1 to E1 implemented by means of the processes of FIG. 6 to FIG. 8 will be described with reference to FIG. 9 to FIG. 13.

Figure 9:
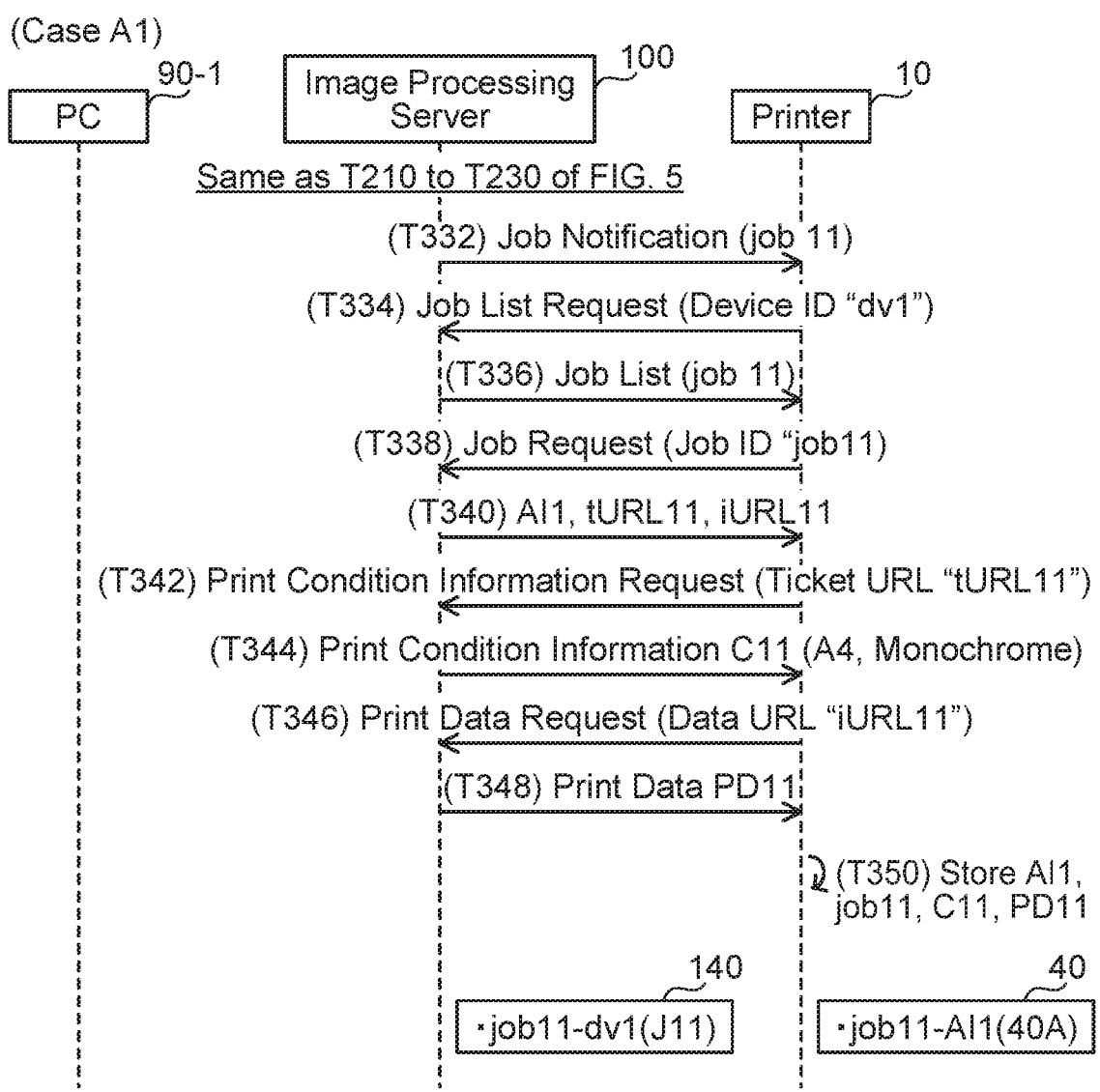
FIG. 9 shows a sequence diagram of case A1 in which a printer receives a job notification from a server.

Case A1; FIG. 9

In case A1, the information corresponding to the job ID "job11" is stored in the accumulation table 40. An initial state of case A1 is the same as the initial state of FIG. 5. Below, the information stored in the job table 140 is illustrated using only the job ID(s) and the device ID(s) associated with the job status "waiting for printing.

First, processes same as T210 to T230 of FIG. 5 are executed among the printer 10, the PC 90-1 and the server 100. In this case, in T332, the printer 10 receives a job notification including the job ID "job11" from the server 100 (YES in S10 of FIG. 6). Next, in T334, the printer 10 sends a job list request including the device ID "dv1" to the server 100 (S20).

Upon receiving the job list request from the printer 10 in T334, the server 100 specifies the device ID "dv1" in this request, and specifies the job ID "job11" associated with the device ID "dv1" and the job status "waiting for printing" in the job table 140. Then, in T336, the server 100 sends a job list including the job ID "job11" to the printer 10.

Upon receiving the job list from the server 100 in T336 (S22), the printer 10 determines that a job ID stored in the accumulation table 40 (that is, no job ID is stored) does not match the job ID "job11" in the job list (NO in S50 of FIG. 7), and determines that no PO job ID exists (NO in S60). Then, the printer 10 determines that one SO job ID (that is, the job ID "job11") exists (YES in S70), specifies the job ID "job11" as the SO job ID, specifies the job ID "job11" as the target SO job ID, determines that a job ID matching the specified job ID "job11" is not stored in the history table 42 (NO in S80). In T338, the printer 10 sends a job request including the job ID "job11" to the server 100 (S90).

Upon receiving the job request from the printer 10 in T338, the server 100 specifies the job ID "job11" in this request, and specifies the account information AI1, the ticket URL "tURL11", the data URL "iURL11", and the job status "waiting for printing" associated with the job ID "job11" in the job table 140. Then, the server 100 sends the specified account information AI1, the specified ticket URL "tURL11", and the specified data URL "iURL11" to the printer 10 in T340.

Upon receiving the information from the server 100 in T340 (S92), the printer 10 sends a print condition information request including the ticket URL "tURL11" to the server 100 in T342 (S94).

Upon receiving the print condition information request from the printer 10 in T342, the server 100 specifies the print condition information C11 (the paper size "A4", the number of print colors "monochrome") stored at the location indicated by the ticket URL "tURL11" in this request, and sends the specified print condition information C11 to the printer 10 in T344.

Upon receiving the print condition information C11 from the server 100 in T344 (S94), the printer 10 sends a print data request including the data URL "tURL11" received in T340 to the server 100 in T346 (S96).

Upon receiving the print data request from the printer 10 in T346, the server 100 specifics the print data PD11 stored at the location indicated by the data URL "tURL11" in this request, and sends the specified print data PD11 to the printer 10 in T348.

Upon receiving the print data PD11 from the server 100 in T348 (S96), the printer 10 stores the account information AI1 received in T340, the job ID "job11" received in T332, the print condition information C11 received in T344, and the print data PD11 received in T348 in association with each other in the accumulation table 40 in T350 (see reference sign 40A of FIG. 2) (S98). Then, the printer 10 determines that the processes of S80 to S98 of FIG. 7 have been executed for all the specified SO job IDs (the job ID "job11") (YES in S100). At this point of time, the job ID "job11" stored in the accumulation table 40 matches the job ID "job11" associated with the device ID "dv1" and the job status "waiting for printing" in the job table 140. That is, the contents of the accumulation table 40 and the contents of the job table 140 match.

Case B1; FIG. 10

In case B1, printing is executed using the print data PD11 corresponding to the job ID "job11" stored in the accumulation table 40 of the printer 10. An initial state of case B1 is a state after case A1. For this reason, the information corresponding to the job ID "job11" is already stored in the accumulation table 40 of the printer 10 (see T350 of FIG. 9), and the information corresponding to the job ID "job11" is already stored in the job table 140 of the server 100 (see T230 of FIG. 5).

First, processes same as T210 to T230 of FIGS. 5, T332 to T350 of FIG. 9 are executed among the printer 10, the PC 90-2, and the server 100. However, in the present case, in T226 of FIG. 5, the second user selects an image file F12, the paper size "A4", and the number of print colors "color". In this case, the server 100 receives a print request including the image file F12 and print condition information C12 (the paper size "A4", the number of print colors "color") from the PC 90-2 in T228. Then, the server 100 converts the image file F12 into print data PD 12 according to the PWG raster format, stores the print data PD 12 in a location "iURL12" in the memory 134, and stores the print condition information C12 in a location "tURL12" in the memory 134. Further, the server 100 creates a job ID "job12", and stores the created job ID "job12", the device ID "dv1", the account information AI2, a ticket URL "tURL12" indicating the location where the print condition information C12 is stored, a data URL "iURL12" indicating the location where the print data PD 12 is stored, and the job status "waiting for printing" in the job table 140 as job information J12 in T230 (see FIG. 2). Thereafter, processes same as T332 to T344 of FIG. 9 are executed between the printer 10 and the server 100 by using the information corresponding to the job ID "job12". Then, in T350, the printer 10 stores the account information AI2, the job ID "job12", the print condition information C12, and the print data PD 12 in association with each other in the accumulation table 40 (see reference sign 40B of FIG. 2).

In T410, the printer 10 receives input of the user ID "U1" and the password "P1" from the first user (YES in S120 of FIG. 8). Upon receiving the job display operation from the first user in T412 (YES in S122), the printer 10 specifies the account information AI1 associated with the logged-in user. Then, the printer 10 specifies the job ID "job11" associated with the account information AI1 in the accumulation table 40, and displays the job selection screen including the specified job ID "job11" in T414 (S130). Upon receiving selection of the job ID "job11" and selection of the print button from the first user in T420 (YES in S140), the printer 10 specifies the print data PD11 associated with the selected job ID "job11" in the accumulation table 40, and executes data conversion on the specified print data PD11 in T422 (S142). Then, the printer 10 executes printing using the converted print data in T424 (S144), deletes the account information AI1, the job ID "job11", the print condition information C11, and the print data PD11 in the accumulation table 40 in T426 (S146), and sends a print completion notification including the job ID "job11" to the server 100 in T428 (S148). Next, the printer 10 stores the job ID "job11" and the print status "printed" in association with each other in the history table 42 in T430 (S150).

Upon receiving the print completion notification from the printer 10 in T428, the server 100 specifies the job ID "job11" in this notification, and updates the job information J11 corresponding to the job ID "job11" in T432. Specifically, the server 100 deletes the ticket URL "iLURL11" and the data URL "tURL11" associated with the job ID "job11" in the job table 140. Further, the server 100 deletes the print condition information C11 stored at the location indicated by the ticket URL "iURL11" and the print data PD11 stored at the location indicated by the data URL "iURL11". Further, the server 100 changes the job status corresponding to the job ID "job11" from "waiting for printing" to "printed". At this point of time, the job ID "job12" stored in the accumulation table 40 matches the job ID "job12" associated with the device ID "dv1" and the job status "waiting for printing" in the job table 140. That is, the contents of the accumulation table 40 and the contents of the job table 140 match.

Case C1; FIG. 11

In case C1, sending of a print completion notification from the printer 10 to the server 100 fails. An initial state of case C1 is a state after the same processes as T210 to T230 of FIG. 5 and T332 to T350 of FIG. 9 have been executed in case B1 of FIG. 10. For this reason, the information 40A corresponding to the job ID "job11" and the information 40B corresponding to the job ID "job12" are already stored in the accumulation table 40 of the printer 10. Further, the Job information J11 corresponding to the job ID "job11" and the job information J12 corresponding to the job ID "job12" are already stored in the job table 140 of the server 100. That is, in the initial state of case C1, the contents of the accumulation table 40 and the contents of the job table 140 match.

First, processes same as T410 to T426 of FIG. 10 are executed between the printer 10 and the server 100. In this case, the printer 10 sends a print completion notification including the job ID "job11" to the server 100. In the present case, sending of the print completion notification from the printer 10 to the server 100 fails due to a poor communication state between the printer 10 and the server 100. In this case, the server 100 does not receive the print completion notification including the job ID "job11", thus the server 100 does not update the job information J11 corresponding to the job ID "job11" in the job table 140. That is, the job status corresponding to the job ID "job11" in the job table 140 is maintained to be "waiting for printing". Further, the ticket URL "tURL11", the data URL "iURL11", the print condition information C11, and the print data PD 11 are not deleted. In T530, the printer 10 stores the job ID "job11" and the print status "printed" in association with each other in the history table 42 (S150). Therefore, at this point of time, the job ID "job12" stored in the accumulation table 40 does not match the job IDs "job11", "job12" associated with the device ID "dv1" and the job status "waiting for printing" in the job table 140. That is, the contents of the accumulation table 40 and the contents of the job table 140 do not match.

Next, processes same as T210 to T230 of FIG. 5 are executed between the PC 90-1 and the server 100 after the communication state between the printer 10 and the server 100 has been improved. However, in the present case, in T226 of FIG. 5, the first user selects an image file F13, a paper size "A3", the number of print colors "color". In this case, in T228, the server 100 receives a print request including the image file F13 and print condition information C13 (the paper size "A3", the number of print colors "color") from the PC 90-1, converts the image file F13 into print data PD13 according to the PWG raster format, stores the print data PD13 at a location "iURL13" in the memory, 134, and stores the print condition information C13 at a location "tURL13" in the memory 134. Further, the server 100 creates a job ID "job13", and stores the created job ID "job13", the device ID "dv1", the ticket URL "tURL13", the data URL "iURL13", and the job status "waiting for printing" in the job table 140 as job information J13 in T230 (see FIG. 2). Then, in T532, the server 100 sends a job notification including the job ID "job13" to the printer 10. T534 is the same as T334 of FIG. 9.

Upon receiving the job list request from the printer 10 in T534, the server 100 specifies the device ID "dv1" in this request, and specifies the job IDs "job11", "job12", "job13" associated with the device ID "dv1" and the job status "waiting for printing" in the job table 140. Then, in T536, the server 100 sends a job list including the job IDs "job11", "job12", "job13" to the printer 10.

Upon receiving the job list from the server 100 in T536 (S20 of FIG. 6), the printer 10 determines that the job ID "job12" included in the accumulation table 40 does not match the job IDs "job11", "job12", "job13" included in the job list (NO in S50 of FIG. 7), and determines that no PO job ID exists (NO in S60). Then, the printer 10 determines that two SO job IDs (the job IDs "job11", "job13") exist (YES in S70), specifies the two SO job IDs, and specifies the job ID "job11" from among the two SO job IDs as the target SO job ID. Then, the printer 10 determines that a job ID matching the job ID "job11" is stored in the history table 42 (YES in S80), and determines that the print status associated with the job ID "job11" in the history table 42 is "printed" (YES in S82). Then, in T538, the printer 10 sends a print completion notification including the job ID "job11" to the server 100 (S84).

Upon receiving the print completion notification from the printer 10 in T538, the server 100 updates the job information J11 in T540. T540 is the same as T432 of FIG. 10. That is, the job status corresponding to the job ID "job11" in the job table 140 is changed to "printed", and the ticket URL "tURL11", the data URL "iURL11", the print condition information C11, and the print data PD11 are deleted.

Next, the printer 10 determines that the processes of S80 to S98 of FIG. 7 have been executed for not both of the two SO job IDs (NO in S100), and specifies the job ID "job13" as the target SO job ID. Then, the printer 10 determines that a job ID matching the job ID "job13" is not stored in the history table 42 (NO in S80), and sends a job request including the job ID "job13" to the server 100 in T550. T552 to T560 are the same as T340 to T348 of FIG. 9 except that information related to the job ID "job13" is communicated. In T562, the printer 10 stores the account information AI1, the job ID "job13", the print condition information C13, and the print data PD13 in association with each other in the accumulation table 40 (see reference sign 40C of FIG. 2) (S98). Then, the printer 10 determines that the processes of S80 to S98 of FIG. 7 have been executed for both of the two SO job IDs (YES in S100).

Effect of Case C1

As shown in case C1, sending of the print completion notification from the printer 10 to the server 100 may fail. In this case, the information corresponding to the print data PD11 for which printing has been executed is deleted from the accumulation table 40 (see T426 of FIG. 10), but the information corresponding to the print data PD11 in the job table 140 of the server 100 is not updated. That is, when sending of the print completion notification from the printer 10 to the server 100 fails, the contents of the accumulation table 40 and the contents of the job table 140 do not match. In the present case, upon receiving the job notification from the server 100 (T532), the printer 10 sends the job list request to the server 100 (T534), and receives the job list from the server 100 (T536). Then, the printer 10 specifies the job ID "job11" as the target SO job ID, specifies that the print status associated with the job ID "job11" in the history table 42 is "printed", and sends the print completion notification including the job ID "job11" to the server 100 (T538). Upon receiving the print completion notification from the printer 10, the server 100 changes the job status corresponding to the job ID "job11" in the job table 140 to "printed", and deletes the print data PD11 (T540). Further, the printer 10 sends the job request including the job ID "job13" to the server 100 (T550), and receives the account information AI1 the print condition information C13, and the print data PD13 from the server 100 (T552 to 560). Then, the printer 10 stores the information received from the server 100 in the accumulation table 40 (T562). Thereby, the job IDs "job12", "job13" stored in the accumulation table 40 of the printer 10 match the job IDs "job12", "job13" associated with the device ID "dv1" and the job status "waiting for printing" in the job table 140. As such, even after sending of the print completion notification from the printer 10 to the server 100 has failed, the contents of the accumulation table 40 and the contents of the job table 140 can be matched.

Figure 12:
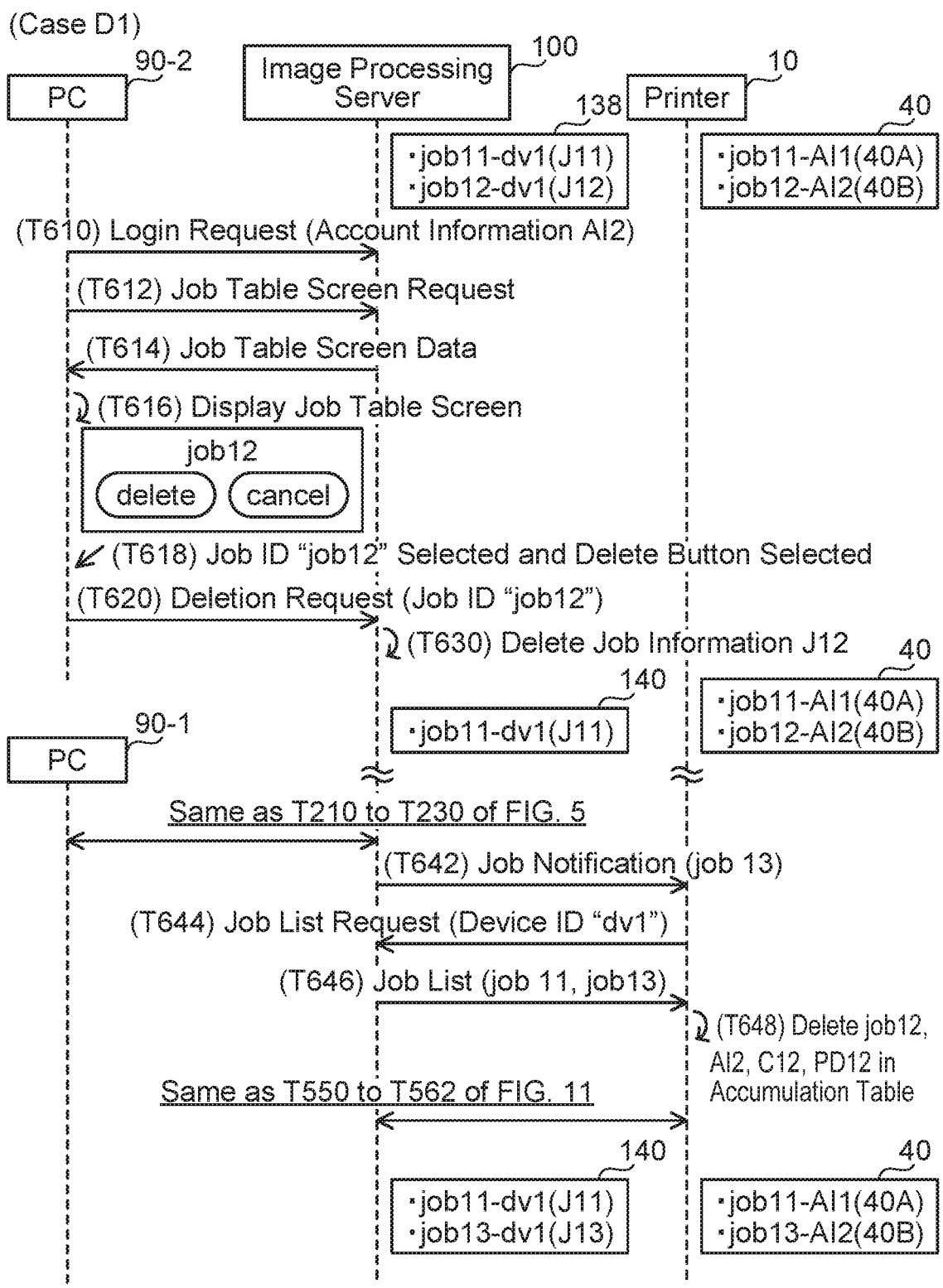
FIG. 12 shows a sequence diagram of case D1 in which a deletion request is sent from a PC to the server.

Case D1; FIG. 12

In case D1, an operation for deleting the job information J12 in the job table 140 is executed by the second user. An initial state of case D1 is the same as the initial state of case C1.

T610 is the same as T10 of FIG. 3 except that the account information AI2 is communicated. In T612, the PC 90-2 sends a job list screen request to the server 100.

Upon receiving the job list screen request from the PC 90-2 in T612, the server 100 specifies the logged-in account information AI2, specifies the job ID "job12" associated with the account information AI2 in the job table 140, and sends job list screen data including the job ID "job12" to the PC 90-2 in T614.

Upon receiving the job list screen data from the server 100 in T614, the PC 90-2 displays a job list screen in T616. This screen includes the job ID included in the job list screen data, a delete button, and a cancel button. Upon receiving selection of the job ID "job12" and selection of the delete button from the second user in T618, the PC 90-2 sends a deletion request including the job ID "job12" to the server 100 in T620.

Upon receiving the deletion request from the PC 90-2, in T620, the server 100 specifies the job ID "job12" in this request, and deletes the job information J12 corresponding, to the job ID "job12" in the job table 140 in T630. The server 100 does not send, to the printer 10, a signal to cause the printer 10 to delete the information associated with the job ID "job12" in the accumulation table 40.

Next, processes same as T210 to T230 of FIG. 5 are executed between the PC 90-1 and the server 100. However, as in case C1 of FIG. 11, the first user selects the image file F13, the paper size "A3", and the number of print colors "color" in T226 of FIGS. 5. T642 and T644 are respectively the same as T532 and T534 of FIG. 11.

Upon receiving the job list request from the printer 10 in T644, the server 100 specifics the device ID "dv1" in this request, and specifies the job ID "job11" associated with the device ID "dv1" and the job status "waiting for printing" in the job table 140. Then, in T646, the server 100 sends a job list including the job ID "job11" to the printer 10.

Upon receiving the job list from the server 100 in T646 (S22), the printer 10 determines that the job IDs "job11", "job12" stored in the accumulation table 40 do not match the job ID "job11" in the job list (NO in S50 of FIG. 7), and determines that a PO job ID (the job ID "job12") exists (YES in S60). Then, the printer 10 deletes the account information AI1, the job ID "job12", the print condition information C12, and the print data PD 12 in the accumulation table 40 in T648 (S62). Further, the printer 10 determines that no SO job ID exists (NO in S70). Thereafter, processes same as T550 to T562 of FIG. 11 are executed between the printer 10 and the server 100.

Effect of Case D1

As shown in case D1, upon receiving the deletion request including the job ID "job12" from the PC 90-2 (T620), the server 100 deletes the job information J12 corresponding to the job ID "job12" in the job table 140 (T630). However, the server 100 does not send a signal indicating that the job information J12 has been deleted to the printer 10. For this reason, the printer 10 does not delete the information corresponding to the job ID "job12" in the accumulation table 40. That is, when the job information in the job table 140 of the server 100 is deleted due to the server 100 receiving the deletion request, the contents of the accumulation table 40 and the contents of the job table 140 do not match. In the present case, upon receiving the job notification from the server 100 (T642), the printer 10 sends the job list request to the server 100 (T644), and receives the job list from the server 100 (T646). Then, the printer 10 specifies the job ID "job12" as the PO job ID, and deletes the job ID "job12" and the information corresponding to the job ID "job12" in the accumulation table 40 (T648). Further, the printer 10 sends the job request including the job ID "job13" to the server 100, and receives the account information AI1, the print condition information C13, and the print data PD13 from the server 100 (T550 to T560). Then, the printer 10 stores the information received from the server 100 in the accumulation table 40 (T562). Thereby, the job IDs "job12", "job13" stored in the accumulation table 40 of the printer 10 match the job IDs "job12", "job13" associated with the device ID "dv1" and the job status "waiting for printing" in the job table 140. As such, the contents of the accumulation table 40 and the contents of the job table 140 can be matched even after the job information in the job table 140 of the server 100 has been deleted due to the server 100 receiving the deletion request.

Further, in a case where the second user wishes to cancel printing with the print data PD 12, the second user operates the PC 90-2 to cause the PC 90-2 to send a deletion request to the server 100. In this case, it is unlikely for the PC 90-2 to receive, from the second user, an operation for causing the printer 10 to execute printing of the print data PD 12. In the present case, upon receiving the job notification front the server 100 (T642), the printer 10 deletes the print data PD 12 in the accumulation table 40 (T648). Consequently, the available storage of the memory 34 can be increased.

Figure 13:
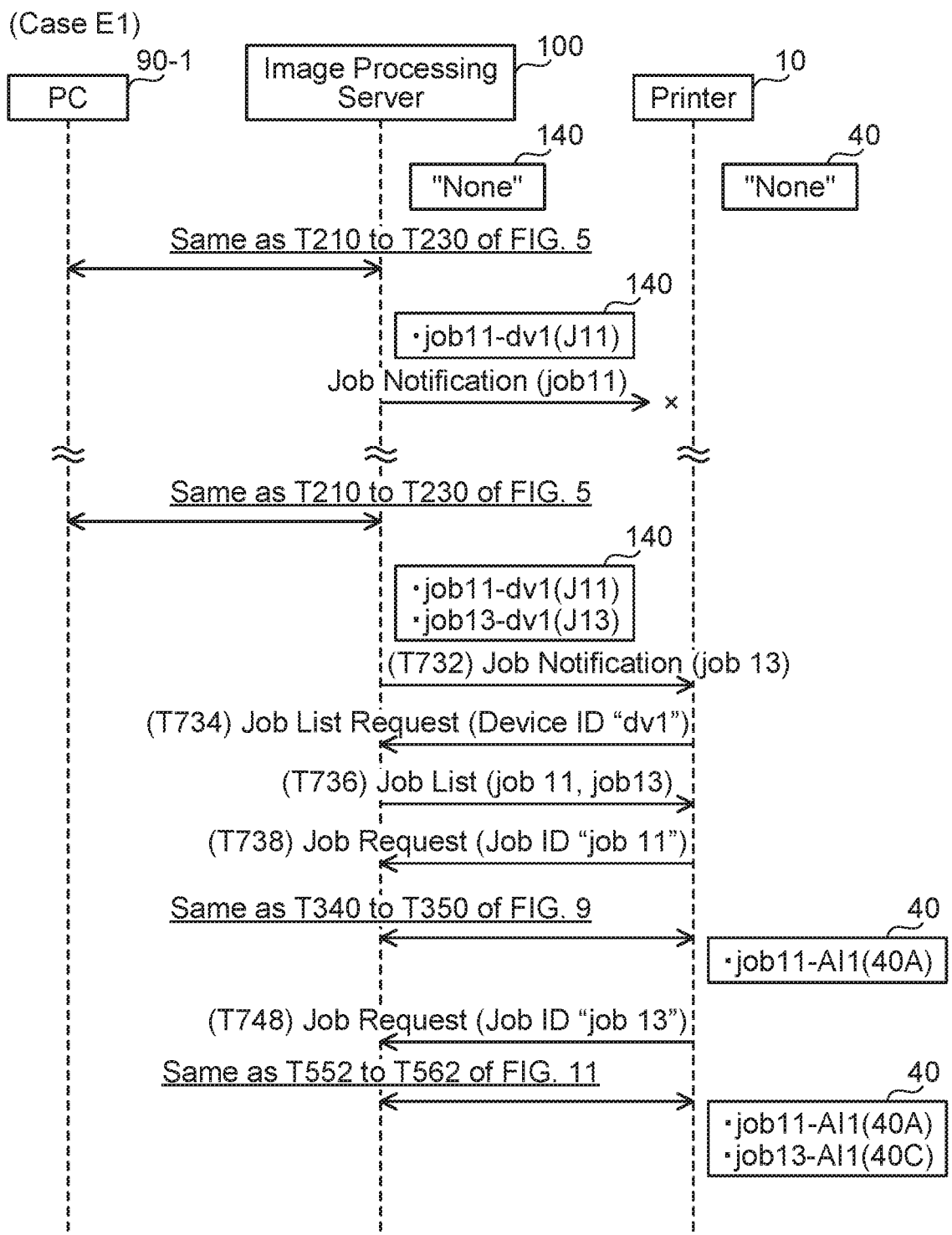
FIG. 13 shows a sequence diagram of case E1 in which sending of a job notification from the server to the printer fails.

Case E1; FIG. 13

In case E1, sending of a job notification from the server 100 to the printer 10 fails. An initial state of case E1 is the same as the initial state of case A1. That is, the accumulation table 40 of the printer 10 and the job table 140 of the server 100 are in an empty state.

First, processes same as T210 to T230 of FIG. 5 are executed between the PC 90-1 and the server 100. In this case, the server 100 sends a job notification including the job ID "job11" to the printer 10. In the present case, sending of the job notification from the server 100 to the printer 10 fails due to a poor communication state between the printer 10 and the server 100. In this case, the printer 10 does not receive the job notification including the job ID "job11", thus the printer 10 does not store the information corresponding to the job ID "job11" in the accumulation table 40.

Next, after the communication state between the printer 10 and the server 100 has been improved, processes same as T210 to T230 of FIG. 5 are executed between the PC 90-1 and the server 100. However, as in case C1 of FIG. 11, the first user selects the image file F13, the paper size "A3", and the number of print colors "color" in T226 of FIG. 5. In this case, in T732, the server 100 sends a job notification including the job ID "job13" to the printer 10. T734 is the same as T334 of FIG. 9.

Upon receiving the job list request from the primer 10 in T734, the server 100 specifies the device ID "dv1" in this request, and specifies the job IDs "job11", "job13" associated with the device ID "dv1" and the job status "waiting for printing" in the job table 140. Then, the server 100 sends a job list including the job IDs "job11", "job13" to the printer 10 in T736.

Upon receiving the job list from the server 100 in T736 (S22 of FIG. 6), the printer 10 determines that a job ID stored in the accumulation table 40 (that is, no job ID is stored) does not match the job IDs "job11", "job13" in the job list (NO in S50 of FIG. 7), and determines that no PO job ID exists (NO in S60). Then, the printer 10 determines that two SO job IDs (the job IDs "job11", "job13") exist (YES in S70), specifies the two SO job IDs, and specifies the job ID "job11" from among the two SO job IDs as the target SO job ID. Then, the printer 10 determines that a job ID matching the job ID "Job11" is not stored in the history table 42 (NO in S80), and sends a job request including the job ID "job11" to the server 100 in T738 (S90). Thereafter, processes same as T340 to T350 of FIG. 9 are executed between the printer 10 and the server 100. Thereby, the information corresponding to the job ID "job11" is stored in the accumulation table 40.

Next, the printer 10 determines that the processes of S80 to S98 of FIG. 7 have been executed for not both of the two SO job IDs (NO in S100), and specifies the job ID "job13"

as the target SO job ID. Then, the printer 10 determines that a job ID matching the job ID "job13" is not stored in the history table 42 (NO in S80) and sends a job request including the job ID "job13" to the server 100 in T748 (S90). Thereafter, processes same as T552 to T562 of FIG. 11 are executed between the printer 10 and the server 100. Thereby, the information corresponding to the job ID "job13" is stored in the accumulation table 40. Then, the printer 10 determines that the processes of S80 to S98 of FIG. 7 have been executed for both of the two SO job IDs (YES in S100).

Effect of Case E1

As shown in case E1, sending of the job notification from the server 100 to the printer 10 may fail. In this case, the information corresponding to the job ID in the job notification is not stored in the accumulation table 40 of the printer 10. That is, when sending of the job notification from the server 100 to the printer 10 fails, the contents of the accumulation table 40 and the contents of the job table 140 do not match. In the present case, upon receiving the job notification from the server 100 (T732), the printer 10 sends the job list request to the server 100 (T734), and receives the job list from the server 100 (T736). Then, the printer 10 specifies the job ID "job11" as the target SO job ID, determines that the job ID "job11" is not stored in the history table 42, sends the job request including the job ID "job11" to the server 100 (T738), and receives the account information AI1, the print condition information C11, and the print data PD11 corresponding to the job ID "job11" from the server 100 (T340 to T348 of FIG. 9). Then, the printer 10 stores the information received from the server 100 in the accumulation table 40. Further, the printer 10 sends the job request including the job ID "job13" to the server 100, and receives the account information AI1, the print condition information C13, and the print data PD13 from the server 100 (T552 to T560). Then, the printer 10 stores the information received from the server 100 in the accumulation table 40 (T562). Thereby, the job IDs "job12", "job13" stored in the accumulation table 40 of the printer 10 match the job IDs "job12", "job13" associated with the device ID "dv1" and the job status "waiting for printing" in the job table 140. As such, even after sending of the job notification from the server 100 to the printer 10 has failed, the contents of the accumulation table 40 and the contents of the job table 140 can be matched.

Effect of Present Embodiment

As described above, a situation can occur in which the contents of the accumulation table 40 and the contents of the job table 140 do not match (case C1 of FIG. 11, case D1 of FIG. 12, case E1 of FIG. 13). In the present embodiment, in the case of receiving the job notification from the server 100 (YES in S10 of FIG. 6), the printer 10 sends the job list request to the server 100 (S20), and receives the job list from the server 100 (S22). Then, by using the job list received from the server 100, the printer 10 executes the matching process (FIG. 7) to match the contents of the accumulation table 40 with the contents of the job table 140. As such, even if a situation occurs in which the contents of the accumulation table 40 and the contents of the job table 140 do not match, the contents of the accumulation table 40 and the contents of the job table 140 can thereafter be matched.

Correspondence Relationships

The network I/F 16 is an example of "communication interface". The image processing server 100 is an example of "server" and "external device". The job table 140 of the server 100 and the accumulation table 40 of the printer 10 are examples of "first table" and "second table", respectively. The image file is an example of "print target image". The job IDs are examples of "data identification information". The data URLs are examples of "data-related information". The print data are examples of "target data". The job notification is an example of "predetermined signal". The job list request is an example of "related information request". The job list is an example of "content-related information". The timing at which YES is determined in S10 of FIG. 6 is an example of "predetermined timing".

The job ID "job12" and the data URL "tURL12" of case D1 of FIG. 12 are examples of "first data identification information" and "first data-related information", respectively. The print data PD 12 of case D1 of FIG. 12 is an example of "first print data" and "first target data".

The print status "printed" in the history table 42 is an example of "print completion information". The job ID "job11" of case C1 of FIG. 11 is an example of "second data identification information". The print data PD11 of case C1 of FIG. 11 is an example of "second print data" and "second target data". The print completion notification is an example of "deletion request". The job ID "job11" of case E1 of FIG. 13 is an example of "third data identification information". The print data PD11 of case E1 of FIG. 13 is an example of "third print data" and "third target data". The job request of T738 of case E1 of FIG. 13 is an example of "data request".

T340 and T348 of FIG. 9 are examples of "receive print data". T350 of FIG. 9 is an example of "store target data obtained by using the print data and the data identification information in a second table in association with each other". S20, S22, and S30 (FIG. 7) of FIG. 6 are respectively examples of "send a related information request", "receive the content-related information", and "execute a matching process".

Second Embodiment

Next, a second embodiment will be described. In the present embodiment, the PCs 90-1, 90-2 each include a printer driver. That is, the PC 90 can convert an image file to create print data having a data format that can be interpreted by the printer 10. Further, in the present embodiment, the CPU 32 of the printer 10 executes an accumulation process of FIG. 14 instead of the accumulation process of FIG. 6. Further, in the present embodiment, upon receiving a job notification from the server 100, the printer 10 executes the same processes as S90 to S98 of FIG. 7. Specifically, the printer 10 sends a job request including the job ID included in the job notification to the server 100 in S90 of FIG. 7.

Figure 14:
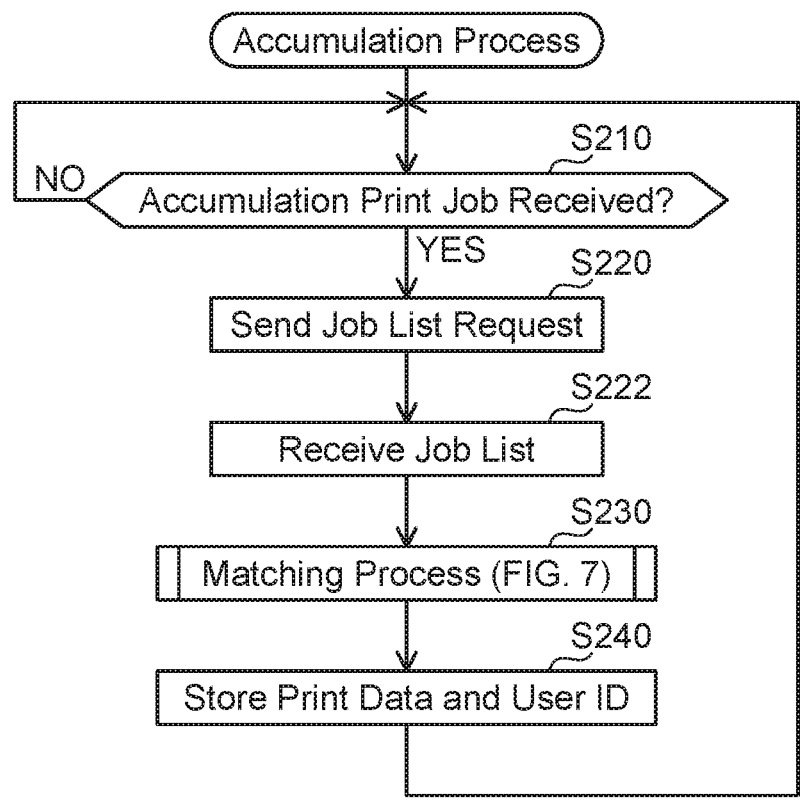
FIG. 14 shows a flowchart of a job update process of a second embodiment.

The accumulation process of the present embodiment will be described with reference to FIG. 14. In S210, the CPU 32 monitors reception of an accumulation print job from the PC 90. The accumulation print job includes print data and the user ID of a user using the PC 90. The accumulation print job is sent using Internet Printing Protocol (IPP), Line Printer daemon protocol (LPR) protocol, or the like. In a case where the accumulation print job is received, the CPU 32 determines YES in S210, and proceeds to S220, S220 to S230 are the same as S20 to S30 of FIG. 6.

In S240, the CPU 32 stores the print data and the user ID in the accumulation print job received in S210 in association with each other in the memory 34. Upon completing S240, the CPU 32 returns to S210. This type of configuration can also achieve the same effects as the first embodiment. In the present embodiment, the print data in the accumulation print job is an example of "predetermined signal".

Third Embodiment

Next, a third embodiment will be described. In the present embodiment, the CPU 32 of the printer 10 executes a job update process of FIG. 16 instead of the accumulation process of FIG. 6 and the job update process of FIG. 8. In the present embodiment, a timing at which the matching process (see FIG. 7) is executed is different from the timing at which the matching process of the first embodiment is executed.

Figure 15:
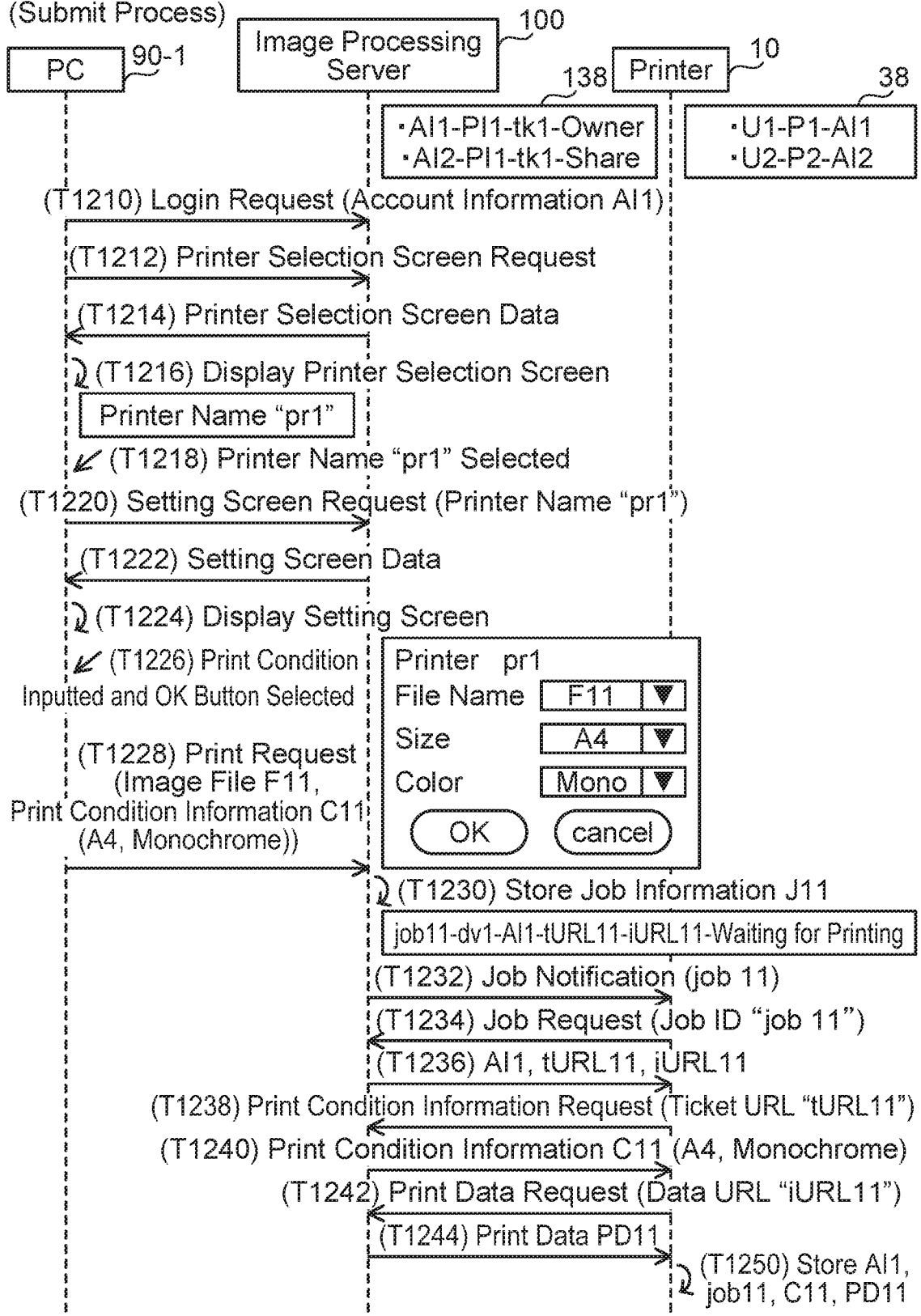
FIG. 15 shows a sequence diagram of a submit process of a third embodiment.

Submit Process; FIG. 15

A submit process executed in the present embodiment will be described with reference to FIG. 15. An initial state of FIG. 15 is the same as the initial state of FIG. 5 of the first embodiment.

T1210 to T1232 are the same as T210 to T232 of FIGS. 5. T1234 to T1244, T1250 are respectively the same as T338 to T348, T350 of FIG. 9.

Figure 16:
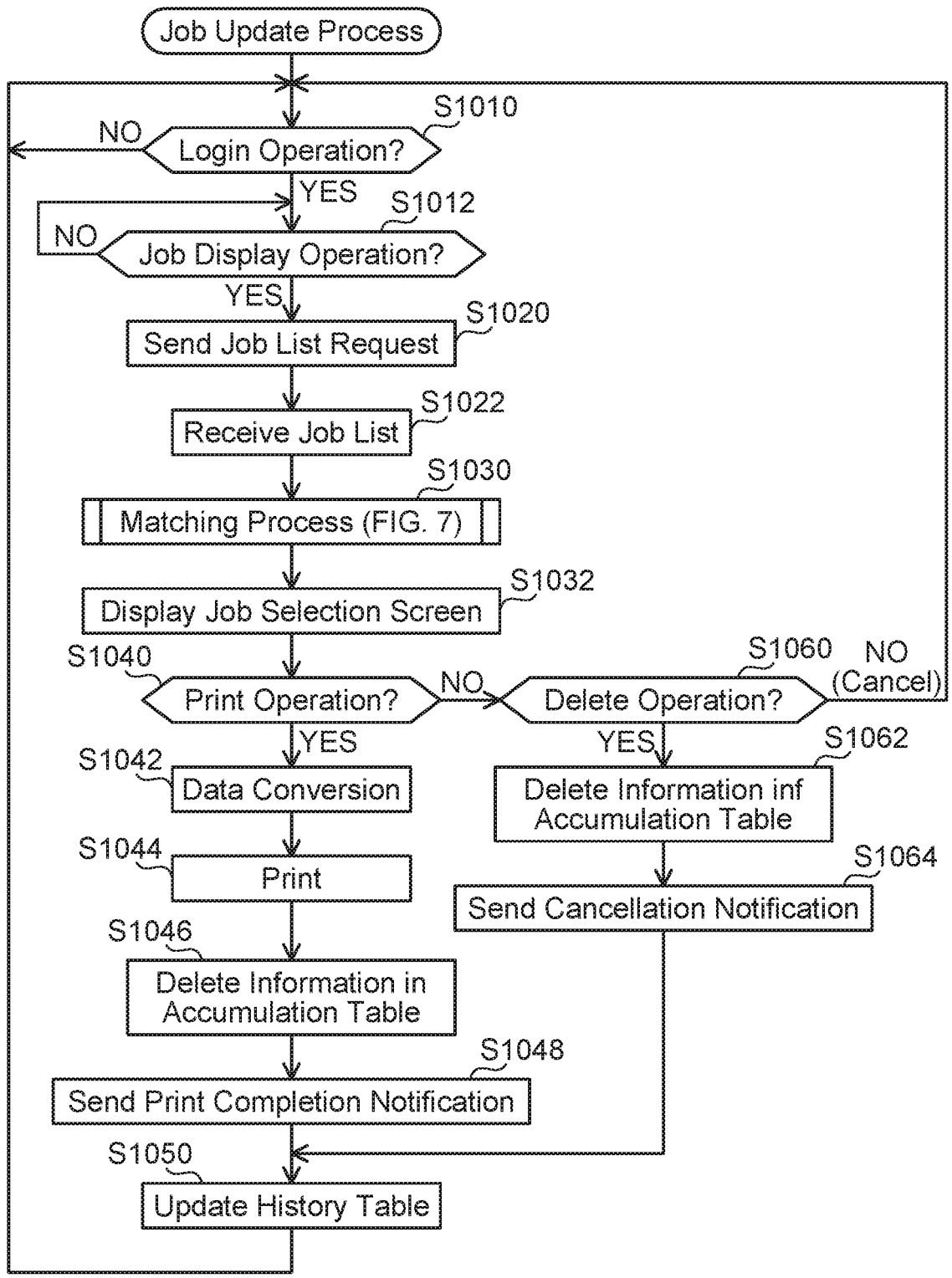
FIG. 16 shows a flowchart of a job update process of the third embodiment.

Job Update Process; FIG. 16

Next, the job update process executed by the CPU 32 of the printer 10 will be described with reference to FIGS. 16.

S1010 and S1012 are respectively the same as S120 and S122 of FIGS. 8. S1020 to S1022 are the respectively the same as S20 and S22 of FIG. 6. In S1030, the CPU 32 executes a matching process (FIG. 7) by using the accumulation table 40 in the memory 34 and the job list received in S1022. S1032 is the same as S130 of FIG. 8. S1040 to S1064 are the same as S140 to S164 of FIG. 8.

Specific Cases

Next, specific cases A3 to D3 executed by means of the processes of FIG. 16, FIG. 7 will be described with reference to FIG. 17 to FIG. 20.

Figure 17:
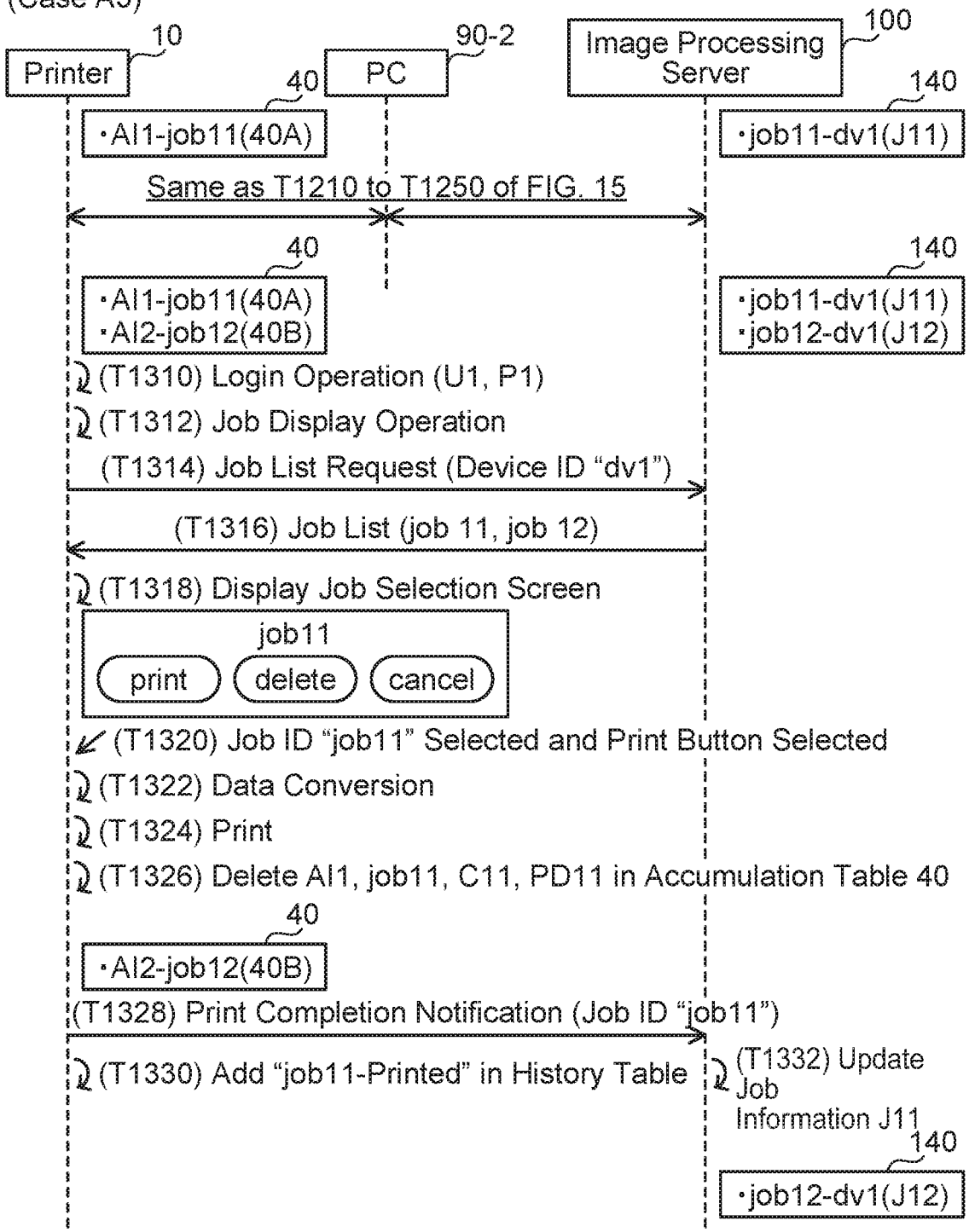
FIG. 17 shows a sequence diagram of case A3 in which printing is executed using print data in the accumulation table of the printer in the third embodiment.

Case A3; FIG. 17

In case A3, printing is executed using the print data PD11 corresponding to the job ID "job11" stored in the accumulation table 40 of the printer 10. An initial state of case A3 is a state after FIG. 15. For this reason, the information corresponding to the job ID "job11" is already stored in the accumulation table 40 of the printer 10 (see T1250 of FIG. 15), and the information corresponding to the job ID "job11" is already stored in the job table 140 of the server 100 (see T1230). In the initial state of case A3, the job ID "job11" stored in the accumulation table 40 matches the job ID "job11" associated with the device ID "dv1" and the job status "waiting for printing" in the job table 140 of the server 100. That is, the contents of the accumulation table 40 and the contents of the job table 140 match. Below, the information stored in the job table 140 is illustrated using only the job ID(s) and the device ID(s) associated with the job status "waiting for printing.

First, processes same as T1210 to T1250 of FIG. 15 are executed among the printer 10, the PC 90-2, and the server 100. However, in the present case, the second user selects an image file F12, a paper size "A4", and the number of print colors "color" in T1226 of FIG. 15. In this case, in T1228, the server 100 receives a print request including the image file F12 and print condition information C12 (the paper size "A4", the number of print colors "color") from the PC 90-2. Then, the server 100 converts the image file F12 into print data PD 12 according to the PWG raster format, stores the print data PD 12 in a location "iURL12" in the memory 134, and stores the print condition information C12 in a location "tURL12" in the memory 134. Further, the server 100 creates a job ID "job12", and stores the created job ID "job12", the device ID "dv1", the account information AI2, the ticket URL "tURL12" indicating the location where the print condition information C12 is stored, the data URL "iURL12" indicating the location where the print data PD 12 is stored, and the job status "waiting for printing" in the job table 140 as job information J12 in T1230 (see FIG. 2). Thereafter, processes same as T1232 to T1244 of FIG. 15 are executed between the printer 10 and the server 100 by using the information corresponding to the job ID "job12". Then, in T1250 the printer 10 stores the account information AI2, the job ID "job12", the print condition information C12 and the print data PD 12 in association with each other in the accumulation table 40 (see reference sign 40B of FIG. 2).

Upon receiving input of the user ID "U1" and the password "P1" from the first user in T1310 (YES in S1010 of FIG. 16) and receiving the job display operation from the first user in T1312 (YES in S1012), the printer 10 sends a job list re/guest including the device ID "dv1" to the server 100 in T1314 (S1020).

Upon receiving the job list request from the printer 10 in T1314, the server 100 specifies the device ID "dv1" in this request, and specifies the job IDs "job11" and "job12" associated with the device ID "dv1" and the job status "waiting for printing" in the job table 140. Then, the server 100 sends a job list including the job IDs "job11" and "job12" to the printer 10 in T1316.

Upon receiving the job list from the server 100 in T1316 (S1022), the printer 10 determines that the job IDs "job11", "job12" included in the accumulation table 40 match the job IDs "job11", "job12" included in the job list (YES in S50 of FIG. 7), and specifies the account information AI1 associated with the logged-in user. Then, the printer 10 specifies the job ID "job11" associated with the account information AI1 in the accumulation table 40, and displays a job selection screen including the specified job ID "job11" in T1318 (S1032). Upon receiving selection of the job ID "job11" and selection of the print button from the first user in T1320 (YES in S1040), the printer 10 specifies the print data PD11 associated with the selected job ID "job11" in the accumulation table 40. and executes data conversion on the specified print data PD11 in T1322 (S1042). Then, the printer 10 executes printing using the converted print data in T1324 (S1044), deletes the account information AI1 the job ID "job11", the print condition information C11, and the print data PD11 in the accumulation table 40 in T1326 (S1046), and sends a print completion notification including the job ID "job11" to the server 100 in T1328 (S1048). Next, the printer 10 stores the job ID "job11" and the print status "printed" in association with each other in the history table 42 in T1330 (S1050).

Upon receiving the print completion notification from the printer 10 in T1328, the server 100 specifies the job ID "job11" in this notification, and updates the job information J11 corresponding to the job ID "job11" in T1332. Specifically, the server 100 deletes the ticket URL "iURL11" and the data URL "tURL11" associated with the job ID "job11" in the job table 140. Further, the server 100 deletes the print condition information C11 stored at the location indicated by the ticket URL "iURL11" and the print data PD11 stored at the location indicated by the data URL "iURL11". Further, the server 100 changes the job status corresponding to the job ID "job11" from "waiting for printing" to "printed". At this point of time, the job ID "job12" stored in the accumulation table 40 matches the job ID "job12" associated with the device ID "dv1" and the job status "waiting for printing" in the job table 140. That is, the contents of the accumulation table 40 and the contents of the job table 140 match.

Figure 18:
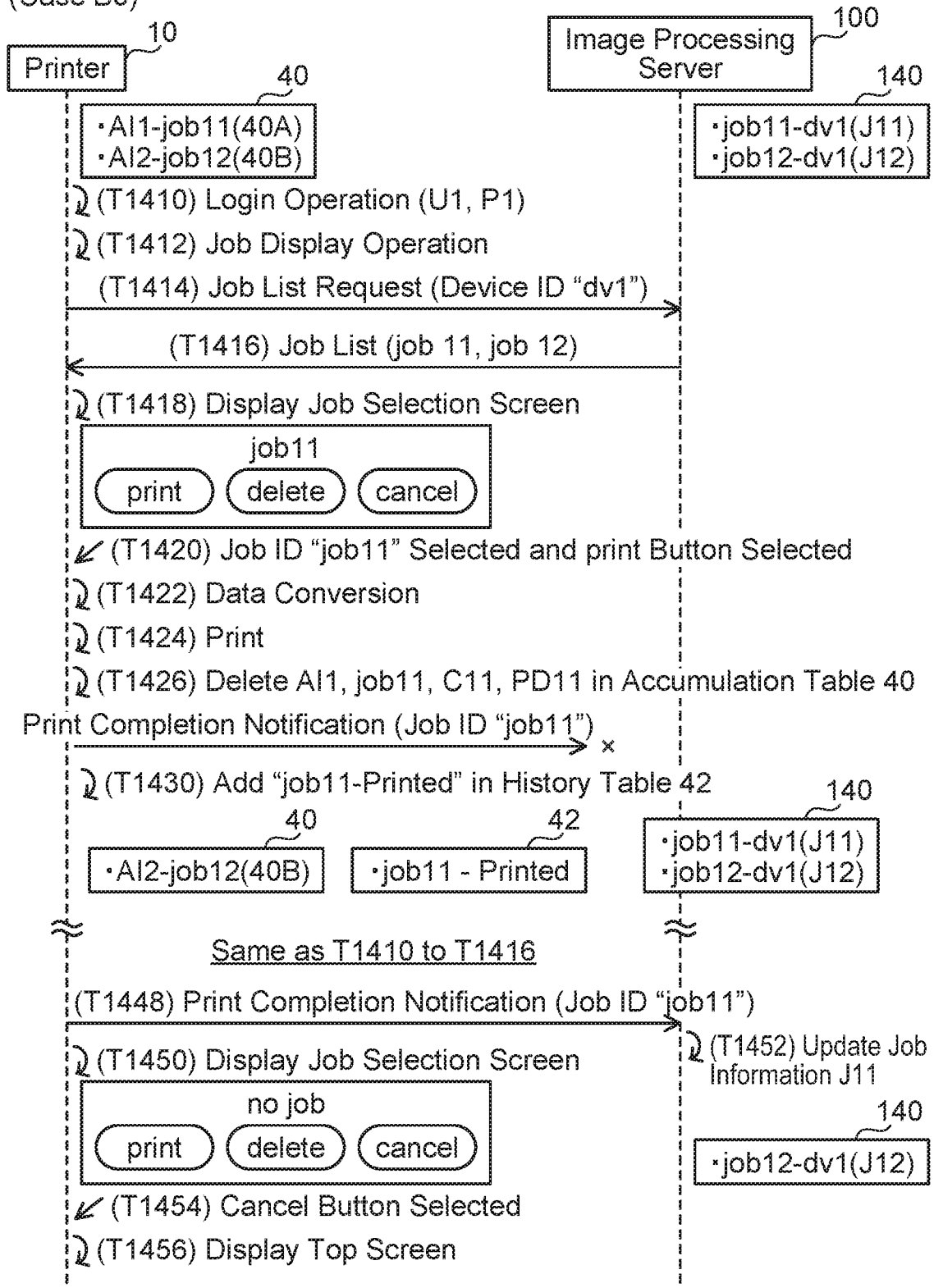
FIG. 18 shows a sequence diagram of case B3 in which sending of a print completion notification from the printer to the server fails in the third embodiment.

Case B3; FIG. 18

In case B3, sending of a print completion notification from the printer 10 to the server 100 fails. An initial state of case B3 is a state after the same processes as T1210 to T1250 of FIG. 15 have been executed in case A3 of FIG. 17. For this reason, the information 40A corresponding to the job ID "job11" and the information 40B corresponding to the job ID "job12" are already stored in the accumulation table 40 of the printer 10. Further, the job information J11 corresponding to the job ID "job11" and the job information J12 corresponding to the job ID "job12" are already stored in the job table 140 of the server 100. That is, in the initial state of case B3, the contents of the accumulation table 40 and the contents of the job table 140 match.

T1410 to T1426 are the same as T1310 to T1326 of FIG. 17. Upon completing the deletion of the information corresponding to the job ID "job11" in the accumulation table 40, the printer 10 sends a print completion notification including the job ID "job11" to the server 100. In the present case, sending of the print completion notification from the printer 10 to the server 100 fails due to a poor communication state between the printer 10 and the server 100. In this case, the server 100 does not receive the print completion notification including the job ID "job11", the server 100 does not update the job information J11 corresponding to the job ID "job11" in the job table 140. That is, the job status corresponding to the job ID "job11" in the job table 140 is maintained to be "waiting for printing". Further, the ticket URL "tURL11", the data URL "iURL11", the print condition information C11, and the print data PD 11 are not deleted. In T1430, the printer 10 stores the job ID "job11" and the print status "printed" in association with each other in the history table 42 (S1050 of FIG. 16).

Next, after the communication state between the printer 10 and the server 100 has been improved, processes same as T1410 to T1416 are executed between the printer 10 and the server 100. Upon receiving the job list including the job IDs "job11", "job12" from the server 100 (S1022 of FIG. 16), the printer 10 determines that the job ID "job12" included in the accumulation table 40 does not match the job IDs "job11", "job12" included in the job list (NO in S50 of FIG. 7), and determines that no PO job ID exists (NO in S60). Then, the printer 10 determines that one SO job ID (the job ID "job11") exists (YES in S70), specifies the job ID "job11" as the target SO job ID, determines that a job ID matching the specified job ID "job11" is stored in the history table 42 (YES in S80), and determines that the print status associated with the job ID "job11" in the history table 42 is "printed" (YES in S82). Then, in T1448, the printer 10 sends a print completion notification including the job ID "job11" to the server 100 (S84 of FIG. 7). The printer 10 determines that the processes of S80 to S98 of FIG. 7 have been executed for all the specified SO job IDs (the job ID "job11") (YES in S100), and displays the job selection screen in T1450 (S1032). This screen displays "no job", indicating that a job ID associated with the account information AI1 in the accumulation table 40 does not exist.

Upon receiving the print completion notification from the printer 10 in T1448, the server 100 updates the job information J11 in T1452. T1452 is the same as T1332 of FIG. 17. That is, the job status corresponding to the job ID "job11" in the job table 140 is changed to "printed", and the ticket URL "tURL11", the data URL, "iURL11", the print condition information C11, and the print data PD11 are deleted.

Upon receiving selection of the cancel button (NO in S1060) from the first user in T1454 after the job selection screen has been displayed, the printer 10 displays a top screen in T1456.

Effect of Case B3

As shown in case B3, sending of the print completion notification from the printer 10 to the server 100 may fail. In this case, the information corresponding to the print data PD11 for which printing has been executed is deleted from the accumulation table 40 (see T1426 of FIG. 18), but the information corresponding to the print data PD11 in the job table 140 of the server 100 is not updated. That is, when sending of the print completion notification from the printer 10 to the server 100 fails, the contents of the accumulation table 40 and the contents of the job table 140 does not match. In the present case, upon receiving the job display operation from the first user (T1412), the printer 10 sends the job list request to the server 100 (T1414), and receives the job list from the server 100 (T1416). Then, the printer 10 specifies the job ID "job11" as the target SO job ID, specifies that the print status associated with the job ID "job11" in the history table 42 is "printed", and sends the print completion notification including the job ID "job11" to the server 100 (T1448). Upon receiving the print completion notification from the printer 10, the server 100 changes the job status corresponding to the job ID "job11" in the job table 140 to "printed", and deletes the print data PD11 (T1452). Thereby, the job ID "job12" stored in the accumulation table 40 of the printer 10 match the job ID "job12" associated with the device ID "dv1" and the job status "waiting for printing" in the job table 140. As such, even after sending of the print completion notification from the printer 10 to the server 100 has failed, the contents of the accumulation table 40 and the contents of the job table 140 can be matched.

Figure 19:
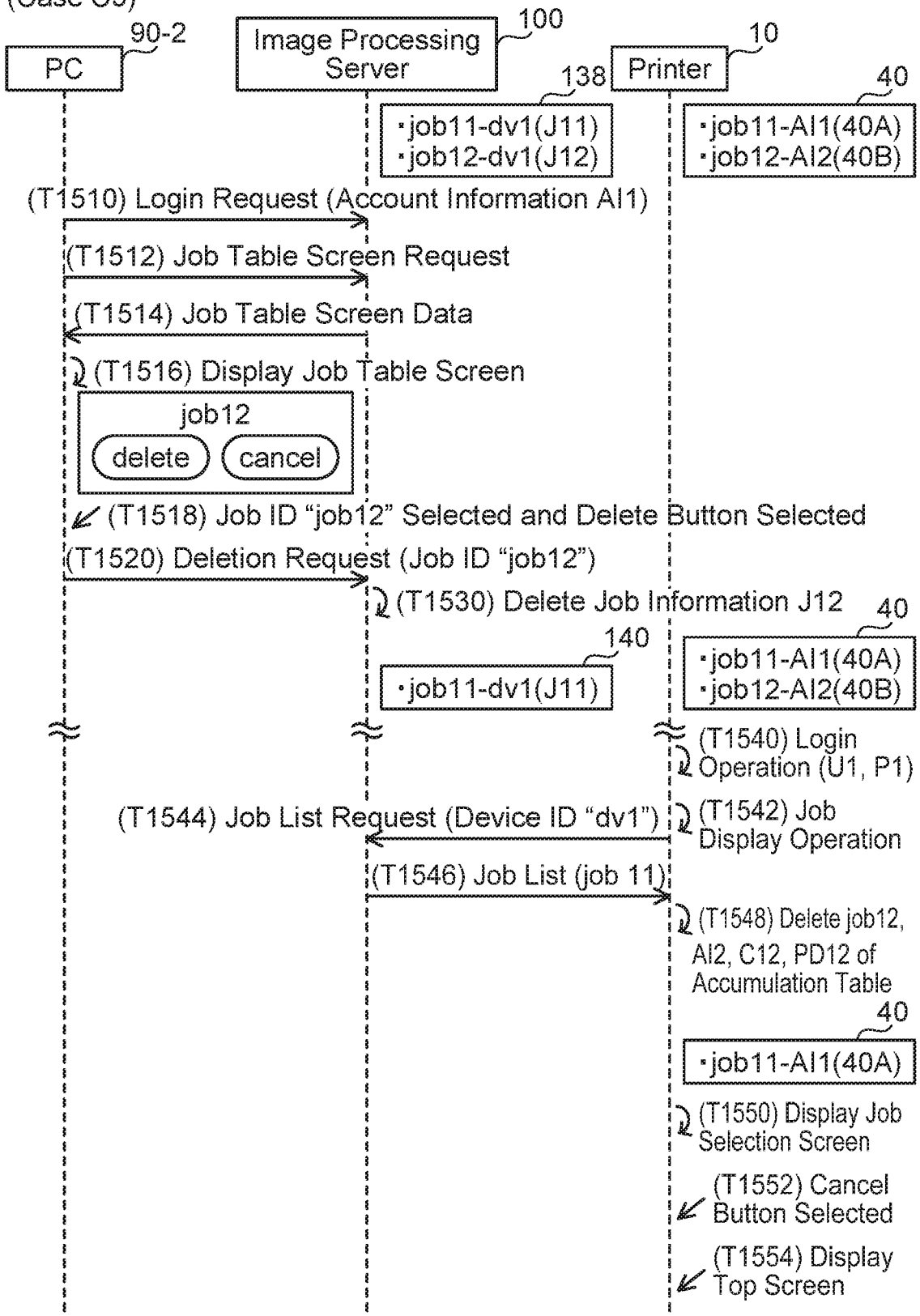
FIG. 19 shows a sequence diagram of case C3 in which a deletion request is sent from the PC to the server in the third embodiment.

Case C3; FIG. 19

In case C3, an operation for deleting the job information J12 in the job table 140 is executed by the second user. An initial state of case C3 is the same as the initial state of case B3.

T1510 is the same as T10 of FIG. 3 except that the account information AI2 is communicated. In T1512, the PC 90-2 sends a job list screen request to the server 100.

Upon receiving the job list screen request from the PC 90-2 in T1512, the server 100 specifies the logged-in account information AI2, specifies the job ID "job12" associated with the account information AI2 in the job table 140, and sends job list screen data including the job ID "job12" to the PC 90-2 in T1514.

Upon receiving the job list screen data from the server 100 in T1514, the PC 90-2 displays a job list screen in T1516. This screen includes the job ID included in the job list screen data, a delete button, and a cancel button. Upon receiving selection of the job ID "job12" and selection of the delete button from the second user in T1518, the PC 90-2 sends a deletion request including the job ID "job12" to the server 100 in T1520.

Upon receiving the deletion request from the PC 90-2 in T1520, the server 100 specifies the job ID "job12" in this request, and deletes the job information J12 corresponding to the job ID "job12" in the job table 140 in T1530. The server 100 does not send, to the printer 10, a signal to cause the printer 10 to delete the information associated with the job ID "job12" in the accumulation table 40.

T1540 to T1544 are the same as T1310 to T1314 of FIG. 17. Upon receiving the job list request from the printer 10 in T1544, the server 100 specifies the device ID "dv1" in this request, specifies the job ID "job11" associated with the device ID "dv1" and the job status "waiting for printing" in the job table 140, and sends a job list including the job ID "job11" to the printer 10.

Upon receiving the job list from the server 100 in T1546 (S22), the printer 10 determines that the job IDs "job11", "job12" stored in the accumulation table 40 do not match the job ID "job11" in the job list (NO in S50 of FIG. 7), and determines that a PO job ID (the job ID "job12") exists (YES in S60), and specifies the job ID "job12" as the PO job ID. Then, in T1548, the printer 10 deletes the account information AI1, the job ID "job12", the print condition information C12, and the print data PD 12 in the accumulation table 40 (S62). Further, the printer 10 determines that no SO job ID exists (NO in S70), and displays the job selection screen in T1550 (S1032). T1552 and T1554 are respectively the same as T1454 and T1456 of FIG. 18.

Effect of Case C3

As shown in case C3, upon receiving the deletion request including the job ID "job12" from the PC 90-2 (T1520), the server 100 deletes the job information J12 corresponding to the job ID "job12" in the job table 140 (T1530). However, the server 100 does not send a signal indicating that the job information J12 has been deleted to the printer 10. For this reason, the printer 10 does not delete the information corresponding to the job ID "job12" in the accumulation table 40. That is, when the job information in the job table 140 of the server 100 is deleted due to the server 100 receiving the deletion request, the contents of the accumulation table 40 and the contents of the job table 140 does not match. In the present case, upon receiving the job display operation from the first user (T1542), the printer 10 sends the job list request to the server 100 (T1544), and receives the job list, from the server 100 (T1546). Then, the printer 10 specifies the job ID "job12" as the PO job ID, and deletes the job ID "job12" and the information corresponding to the job ID "job12" in the accumulation table 40 (T1548). Thereby, the job ID "job11" stored in the accumulation table 40 of the printer 10 match the job ID "job11" associated with the device ID "dv1" and the job status "waiting for printing" in the job table 140. As such, the contents of the accumulation table 40 and the contents of the job table 140 can be matched even after the job information in the job table 140 of the server 100 has been deleted due to the server 100 receiving the deletion request.

Further, in a case where the second user wishes to cancel printing with the print data PD 12, the second user operates the PC 90-2 to cause the PC 90-2 to send a deletion request to the server 100. In this case, it is unlikely for the PC 90-2 to receive, from the second user, an operation for causing the printer 10 to execute printing of the print data PD 12. In the present case, upon receiving the job display operation from the second user, the printer 10 deletes the print data PD 12 in the accumulation table 40 (T1548). Consequently, the available storage of the memory 34 can be increased.

Figure 20:
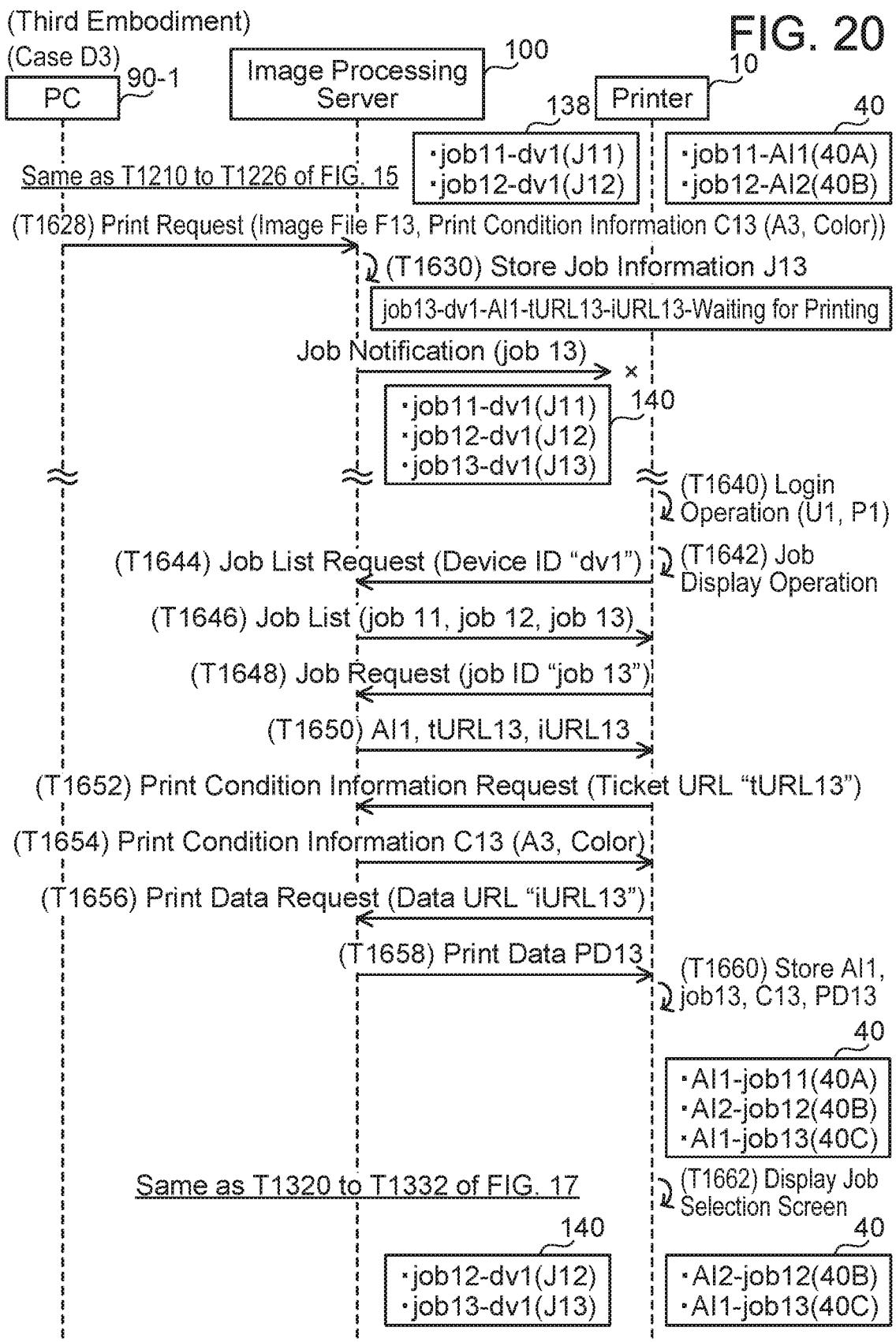
FIG. 20 shows a sequence diagram of case D3 in which sending of a job notification from the server to the printer fails in the third embodiment.

Case D3; FIG. 20

In case D3, sending of a job notification from the server 100 to the printer 10 fails. An initial state of case D3 is the same as the initial state of case B3 of FIG. 18.

First, processes same as T1210 to T1226 of FIG. 15 are executed among the printer 10, the PC 90-1 and the server 100. However, in the present case, the first user selects an image file F13, a paper size "A3", and the number of print colors "color" in T1226 of FIG. 15. In this case, in T1628, the server 100 receives a print request including the image file F13 and print condition information C13 (the paper size "A3", the number of print colors "color") from the PC 90-1. Then, the server 100 converts the image file F13 into print data PD13 according to the PWG raster format, stores the print data PD13 at a location "iURL13" in the memory 134, and stores the print condition information C13 at a location "tURL13" in the memory 134. Further, the server 100 creates a job ID "job13" and, stores the created job ID "job13", the device ID "dv1", the ticket URL "tURL13", the data URL "iURL13", and the job status "waiting for printing" in the job table 140 as job information J13 in T1630 (see FIG. 2). Then, the server 100 sends a job notification including the job ID "job13" to the printer 10. In the present case, sending of the job notification from the server 100 to the printer 10 fails due to a poor communication state between the printer 10 and the server 100. In this case, the printer 10 does not receive the job notification including the job ID "job13", thus the printer 10 does not store the information corresponding to the job ID "job13" in the accumulation table 40.

Next, after the communication state between the printer 10 and the server 100 has been improved, printing is executed using the print data PD11 corresponding to the job ID "job11" stored in the accumulation table 40 of the printer 10. T1640 to T1644 are the same as T1310 to T1314 of FIG. 18.

Upon receiving the job list request from the printer 10 in T1644, the server 100 specifies the device ID "dv1." in this request, and specifies the job IDs "job11", "job12", "job13" associated with the device ID "dv1" and the job status "waiting for printing" in the job table 140. Then, in T1646, the server 100 sends a job list including the job IDs "job11", "job 12", "job13" to the printer 10.

Upon receiving the job list from the server 100 in T1646, the printer 10 determines that the job IDs "job11" "job12" stored in the accumulation table 40 do not match the job IDs "job11", "job12", "job13" in the job list (NO in S50 of FIG. 7), and determines that no PO job ID exists 10 in S60). Then, the printer 10 determines that one SO job ID (the job ID "job13") exists (YES in S70), specifies the job ID "job13" as the target SO job ID, determines that a job ID matching the specified job ID "job13" is not stored in the history table 42 (NO in S80) and sends a job request including the job ID "job13" to the server 100 in T1648 (S90). T1650 to T1658 (S92 to S96) are the same as T1236 to T1244 of FIG. 15 except that information related to the job ID "job13" is communicated. In T1660, the printer 10 stores the account information AI1, the job ID "job13", the print condition information C13, and the print data PD13 in association with each other in the accumulation table 40 (see reference sign 40C of FIG. 2) (S98). Further, the printer 10 determines that the processes of S80 to S98 of FIG. 7 have been executed for all the specified SO job IDs (the job ID "job13") (YES in S100), and displays the job selection screen in T1662 (S1032). Thereafter, processes same as T1320 to T1332 of FIG. 17 are executed. In this case, the information corresponding to the job ID "job11" in the accumulation table 40 of the printer 10 is deleted, and the job status corresponding to the job ID "job11" in the job table 140 of the server 100 is changed to "printed".

Effect of Case D3

As shown in case D3, sending of a job notification from the server 100 to the printer 10 may fail. In this case, the information corresponding to the job ID in the job notification is not stored in the accumulation table 40 of the printer 10. That is, when sending of the job notification from the server 100 to the printer 10 fails, the contents of the accumulation table 40 and the contents of the job table 140 do not match. In the present case, upon receiving the job display operation from the first user (T1642), the printer 10 sends the job list request to the server 100 (T1644), and receives the job list from the server 100 (T1646). Then, the printer 10 specifies the job ID "job13" as the target SO job ID, determines that the job ID "job13" is not stored in the history table 42, and sends the job request including the job ID "job13" to the server 100 (T1648). In response to the printer 10 sending the job request to the server 100, the printer 10 receives the account information AI1, the ticket URL "tURL13", the data URL "iURL13", the print condition information C13, and the print data PD13 from the server 100 (T1650 to T1658). Then, the printer 10 stores the information received from the server 100 in the accumulation table 40 (T1660). Thereby, the job IDs "job11", "job12", "job13" stored in the accumulation table 40 of the printer 10 match the job IDs "job11", "job12", "job13" associated with the device ID "dv1" and the job status "waiting for printing" in the job table 140. Consequently, even after sending of the job notification from the server 100 to the printer 10 has failed, the contents of the accumulation table 40 and the contents of the job table 140 can be matched.

Effect of Present Embodiment

As described above, a situation can occur in which the contents of the accumulation table 40 and the contents of the job table 140 do not match (case B3 of FIG. 18, case C3 of FIG. 19, case D3 of FIG. 20). In the present embodiment, in the case of receiving a job display operation (YES in S1012 of FIG. 16), the printer 10 sends a job list request to the server 100 (S1020), and receives a job list from the server 100 (S1022). Then, using the job list received from the server 100, the printer 10 executes the matching process (FIG. 7) to match the contents of the accumulation table 40 with the contents of the job table 140. As such, even if a situation occurs in which the contents of the accumulation table 40 and the contents of the job table 140 do not match, the contents of the accumulation table 40 and the contents of the job table 140 can thereafter be matched.

Correspondence Relationships

The network I/F 16 is an example of "communication interface". The image processing server 100 is an example of "server". The job table 140 of the server 100 and the accumulation table 40 of the printer 10 are respectively examples of "first table" and "second table". The image files are examples of "print target image". The job IDs are examples of "data identification information". The data URLs are examples of "data-related information". The print data is an example of "target data". The job list request is an example of "related information request". The job list is an example of "content-related information". The timing at which YES is determined in S1012 of FIG. 16 is an example of "predetermined timing".

The job ID "job12" and the data URL "tURL12" of case C3 of FIG. 19 are examples of "first data identification information" and "first data-related information", respectively. The print data PD 12 of case C3 of FIG. 19 is an example of "first print data" and "first target data".

The print status "printed" in the history table 42 is an example of "print completion information". The job ID "job11" of case B3 of FIG. 18 is an example of "second data identification information". The print data PD11 of case B3 of FIG. 18 is an example of "second print data" and "second target data". The print completion notification is an example of "the deletion request". The job ID "job13" of case D3 of FIG. 20 is an example of "third data identification information". The print data PD13 of case D3 of FIG. 20 is an example of "third print data" and "third target data". The job request of T648 of case D3 of FIG. 20 is an example of "data request".

T1236 and T1244 of FIG. 15 are examples of "receive print data". T1250 of FIG. 15 is an example of "store target data obtained by using the print data and the data identification information in a second table in association with each other". S1020, S1022, and S1030 (FIG. 7) of FIG. 16 are examples of "send a related information request", "receive the content-related information", and "execute a matching process", respectively.

Fourth Embodiment

Figure 21:
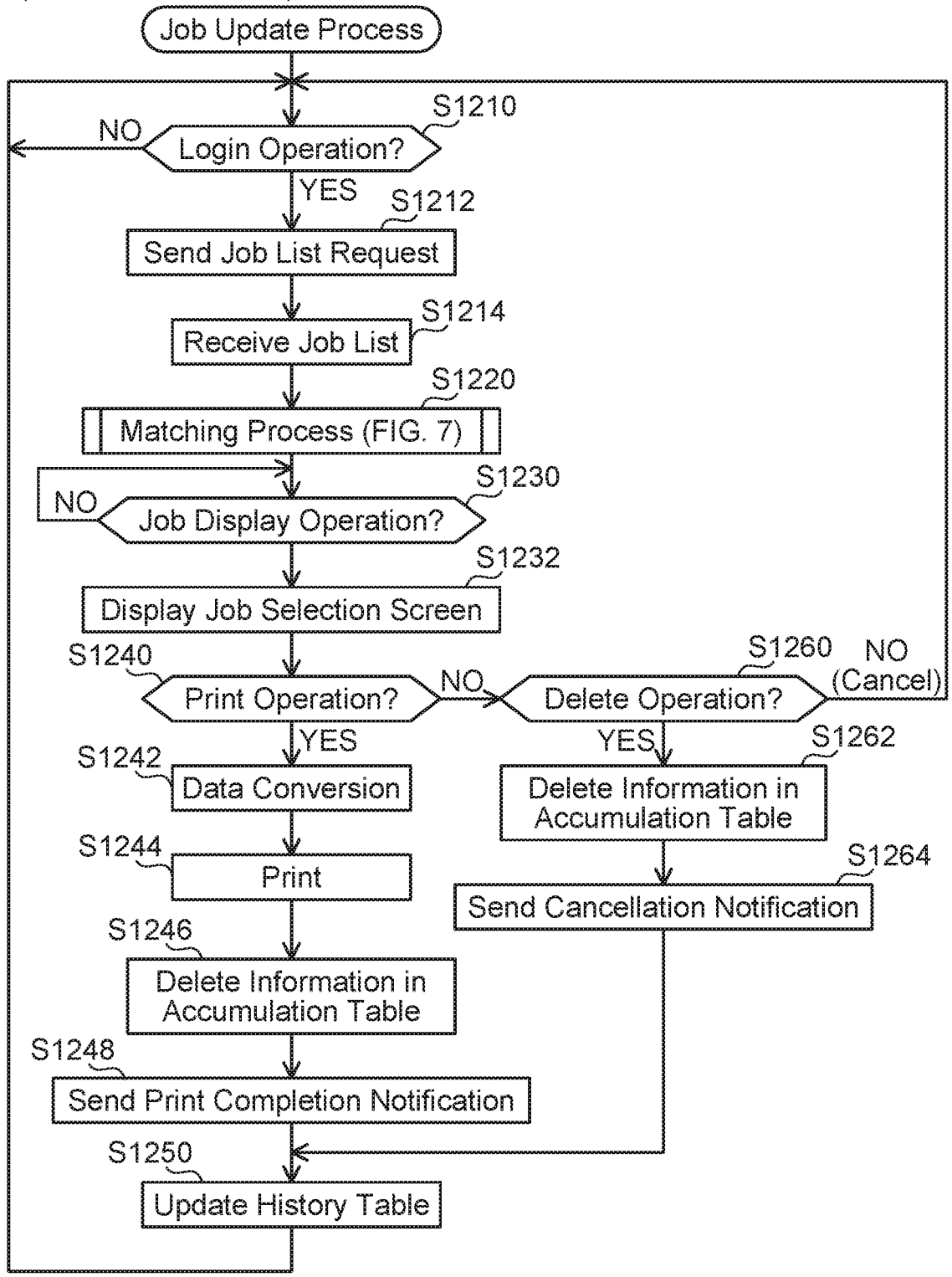
FIG. 21 shows a flowchart of a job update process of a fourth embodiment.

Next, a fourth embodiment will be described. In the fourth embodiment, the CPU 32 of the printer 10 executes a job update process of FIG. 21 instead of the job update process of FIG. 16 of the third embodiment. In the present embodiment, a timing at which a job list request is sent from the printer 10 to the server 100 is different from that of the third embodiment. As shown in FIG. 21, in a case where the login operation is performed (YES in S1210), the CPU 32 sends a job list request to the server 100 in S1212, S1214 and S1220 are respectively the same as S1022 and S1030 of FIG. 16, S1230 is same as S1012 of FIG. 16. Succeeding S1232 to S1264 are the same as S1032 to S1064. This type of configuration can also achieve the same effects as the third embodiment. In the present embodiment, the timing at which YES is determined in S1210 of FIG. 21 is an example of "predetermined timing".

(Variant 1) Print data, instead of the data URL, may be stored in the job table 140 of the server 100. In the present variant, the print data is an example of "data-related information".

(Variant 2) Upon receiving the print data PD11 from the server 100 in T348 of FIG. 9 (or T1244 of FIG. 15), the printer 10 may execute data conversion on the print data PD11, and may store, in T350 (or T1250), the account information AI1, the job ID "job11", the print condition information C11, and the converted print data in association with each other in the accumulation table 40. In the present variant, the converted print data is an example of "target data". Further, in another variant, upon receiving the print data PD11 from the server 100, the printer 10 may encrypt the print data PD to create encrypted data, and may store, in T350 (or T1250), the account information AI1, the job ID "job11", the print condition information C11 and the created encrypted data in association with each other in the accumulation table 40. In the present variant, the encrypted data is an example of "target data".

(Variant 3) The accumulation table 40 may be stored in an external memory such as a USB memory. In the present variant, the external memory such as a USB memory is an example of "memory".

(Variant 4) The "predetermined timing" may be a timing at which a power source of the printer 10 is turned on. Further, in another variant, the "predetermined timing" may be a timing at which communication with the server 100 is executed. For example, the printer 10 may be configured to send a job list request after having sent a print completion notification to the server 100. Further, in another variant, the printer 10 may send a job list request to the server 100 every predetermined time. In the present variant, a timing at which the predetermined time has elapsed since the job list request was sent is an example of "predetermined timing". The printer 10 may be configured to change the predetermined time depending on an available storage in the memory 34.

(Variant 5) S60 and S62 of FIG. 7 may be omitted in an environment where a PO job ID (that is, a job ID that is included in the accumulation table 40 of the printer 10 but is not included in a job list received from the server 100) is not expected to occur. In the present variant, "matching process" may not be executed to "delete the first data identification information and the first target data from the second table".

(Variant 6) S70 to S100 of FIG. 7 may be omitted in an environment where an SO job ID (that is, a job ID that is included in a job list received from the server 100 but is not included in the accumulation table 40 of the printer 10) is not expected to occur. In the present variant, the "matching process" may not be executed to "send a deletion request", and may not include "sending process", "receiving process", or "storing process". Further, "store print completion information" may be omitted.

(Variant 7) The process of S1010 of FIG. 16 may be omitted. In the present variant, the account information in the user table 38 of the printer 10 and the account information in the accumulation table 40 may be omitted, in the present variant, the CPU 32 displays, on the display unit 14, a job selection screen including all the job IDs in the accumulation table 40 in S1032.

(Variant 8) In each of the above embodiments, the respective processes of FIG. 3 to FIG. 21 are implemented by software (that is, the program 36). Instead of this, at least one of the processes may be implemented by hardware such as a logic circuit.

What is claimed is:
1. A printer comprising:
a communication interface;
a processor; and
a memory storing computer-readable instructions therein, wherein the computer-readable instructions, when executed by the processor, cause the printer to:
receive print data corresponding to a print target image and data identification information identifying the print data from a server via the communication interface, wherein in a case where a print request for causing the printer to execute printing of the print target image is received from a terminal device, the server stores data-related information related to the print data and the data identification information in a first table in association with each other, and sends the print data and the data identification information to the printer;
in a case where the print data and the data identification information are received from the server, store target data obtained by using the print data and the data identification information in a second table in association with each other;
in a case where a predetermined timing has arrived, send a related information request to the server via the communication interface, the related information request being a signal for requesting the server to send content-related information related to contents in the first table;
receive the content-related information from the server via the communication interface in response to sending the related information request to the server; and
in a case where the content-related information is received from the server, execute a matching process of matching the contents of the first table with contents of the second table by using the content-related information.

2. The printer as in claim 1, wherein
in a case where the content-related information indicates that the first table does not store first data identification information due to the first data identification information and first data-related information having been deleted from the first table after the first data identification information and the first data-related information had been stored in the first table in association with each other, and the second table stores the first data identification information and first target data obtained by using first print data in association with each other, the matching process is executed to delete the first data identification information and the first target data from the second table.

3. The printer as in claim 1, further comprising:
a print executing unit,
wherein the computer-readable instructions, when executed by the processor, further cause the printer to:
in a case where an instruction for executing printing of the print target image corresponding to the target data in the second table is given, cause the print executing unit to execute the printing of the print target image by using the target data;
in a case where the printing of the print target image is completed, delete the data identification information and the target data from the second table; and
in the case where the printing of the print target image is completed, store print completion information including the data identification information in the memory.

4. The printer as in claim 3, wherein
in a case where the content-related information indicates that the first table stores second data identification information, the second table does not store the second data identification information or second target data obtained by using second print data, and the memory stores the print completion information including the second data identification information, the matching process is executed to send a deletion request including the second data identification information to the server via the communication interface, wherein the deletion request is a signal for requesting the server to delete second data-related information associated with the second data identification information from the first table.

5. The printer as in claim 4, wherein the deletion request includes information indicating that printing of a second print target image corresponding to the second target data in the second table is completed.

6. The printer as in claim 3, wherein in a case where the content-related information indicates that the first table stores third data identification information, the second table does not store the third data identification information or third target data obtained by using third print data, and the memory does not store the print completion information including the third data identification information, the matching process including a sending process, a receiving process and a storing process is executed, the sending process includes a process of sending a data request including the third data identification information to the server via the communication interface, the data request being a signal for requesting the server to send the third print data identified by third data-related information stored in association with the third data identification information in the first table, the receiving process includes a process of receiving the third print data from the server via the communication interface in response to sending the data request to the server, and the storing process includes a process of storing the third data identification information and the third target data obtained by using the third print data in association with each other in the second table.

7. The printer as in claim 1, wherein the computer-readable instructions, when executed by the processor, further cause the printer to:

receive a predetermined signal from an external device via the communication interface, wherein the predetermined timing includes a timing at which the predetermined signal is received from the external device.

8. The printer as in claim 7, wherein the external device is the server, and the predetermined signal is a notification sent from the server to the printer in a case where the server stores the print data and the data identification information in association with each other in the first table.

9. The printer as in claim 7, wherein the external device is the terminal device, and the predetermined signal includes print data corresponding to a print target image.

10. The printer as in claim 1 further comprising:

a display unit, wherein the predetermined timing includes a timing at which an instruction for displaying a screen indicating the contents of the second table on the display unit is obtained.

11. The printer as in claim 1, wherein the predetermined timing includes a timing at which a login operation for logging in to the printer is executed.

12. A non-transitory computer-readable recording medium storing computer-readable instructions for a printer, wherein the computer-readable instructions, when executed by a processor of the printer, cause the printer to:

receive print data corresponding to a print target image and data identification information identifying the print data from a server via a communication interface of the printer, wherein in a case where a print request for causing the printer to execute printing of the print target image is received from a terminal device, the server stores data-related information related to the print data and the data identification information in a first table in association with each other, and sends the print data and the data identification information to the printer;

in a case where the print data and the data identification information are received from the server, store target data obtained by using the print data and the data identification information in a second table in association with each other;

in a case where predetermined a timing has arrived, send a related information request to the server via the communication interface, the related information request being a signal for requesting the server to send content-related information related to contents in the first table;

receive the content-related information from the server via the communication interface in response to sending the related information request to the server; and in a case where the content-related information is received from the server, execute a matching process of matching the contents of the first table with contents of the second table by using the content-related information.

* * * * *